US008731321B2

United States Patent
Fujiwara et al.

(10) Patent No.: US 8,731,321 B2
(45) Date of Patent: May 20, 2014

(54) IMAGE PROCESSING DEVICE, IMAGE PROCESSING METHOD, IMAGE PROCESSING PROGRAM, AND RECORDING MEDIUM WITH RECORDED IMAGE PROCESSING PROGRAM

(75) Inventors: Akira Fujiwara, Osaka (JP); Kazuyuki Nako, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 173 days.

(21) Appl. No.: 13/504,424

(22) PCT Filed: Aug. 4, 2010

(86) PCT No.: PCT/JP2010/063220
§ 371 (c)(1),
(2), (4) Date: Apr. 26, 2012

(87) PCT Pub. No.: WO2011/052276
PCT Pub. Date: May 5, 2011

(65) Prior Publication Data
US 2012/0263394 A1 Oct. 18, 2012

(30) Foreign Application Priority Data
Oct. 28, 2009 (JP) ................. 2009-247788

(51) Int. Cl.
*G06K 9/40* (2006.01)

(52) U.S. Cl.
USPC ............ 382/266; 345/427; 348/241; 382/309

(58) Field of Classification Search
None
See application file for complete search history.

(56) References Cited

U.S. PATENT DOCUMENTS

| 7,425,958 | B2 * | 9/2008 | Berger et al. | 345/427 |
| 8,605,174 | B2 * | 12/2013 | Namie et al. | 348/241 |
| 2004/0022451 | A1 | 2/2004 | Fujimoto et al. | |
| 2005/0078192 | A1 | 4/2005 | Sakurai et al. | |
| 2005/0078200 | A1 * | 4/2005 | Morichika | 348/231.99 |
| 2008/0226171 | A1 | 9/2008 | Yin et al. | |
| 2008/0317387 | A1 * | 12/2008 | Berger et al. | 382/309 |
| 2009/0225180 | A1 | 9/2009 | Maruyama et al. | |

FOREIGN PATENT DOCUMENTS

| JP | 8-163427 A | 6/1996 |
| JP | 2004-40395 A | 2/2004 |
| JP | 2005-122320 A | 5/2005 |
| JP | 2005-122328 A | 5/2005 |
| JP | 2005-258718 A | 9/2005 |
| JP | 2007-58634 A | 3/2007 |
| JP | 2008-257713 A | 10/2008 |

* cited by examiner

*Primary Examiner* — Tsung-Yin Tsai
(74) *Attorney, Agent, or Firm* — Birch, Stewart, Kolasch & Birch, LLP

(57) ABSTRACT

An image processing device (10) includes: a line segment extracting section (14) for generating a line segment image obtained by extracting contour line segments contained in a contour of a subject in a captured image; a candidate quadrilateral calculating section (15) for (i) putting at least one virtual line segment in the line segment image (ii) selecting four line segments from a set containing the at least one virtual line segment and the contour line segments, and (iii) identifying a quadrilateral defined by four straight lines containing respective selected four line segments; and an image correcting section (17) for correcting a distortion in perspective transformation of the captured image based on the quadrilateral identified by the candidate quadrilateral calculating section (15). With the configuration, the distortion of the subject can be corrected without manually adjusting a degree of correction, even in a case where the subject having sides is partially not contained in the captured image or the subject is not a document image.

7 Claims, 27 Drawing Sheets

F I G. 9
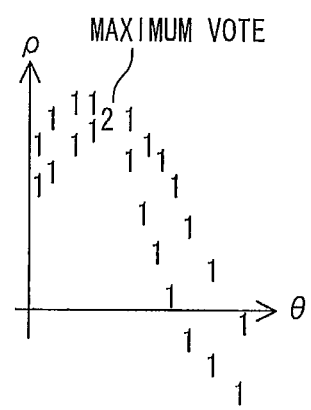

F I G. 1 1
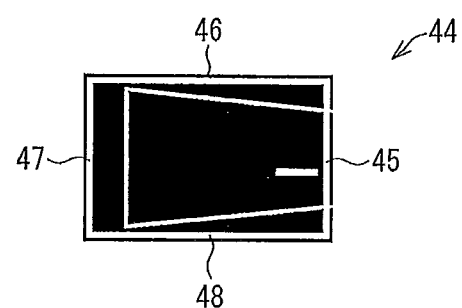

F I G. 3 2

(a)

| 0 | 0 | 0 | 0 | 0 | 0 |
|---|---|---|---|---|---|
| 0 | 1 | 1 | 0 | 0 | 0 |
| 0 | 1 | 1 | 1 | 1 | 1 |
| 0 | 1 | 2 | 1 | 1 | 1 |
| 0 | 1 | 2 | 1 | 1 | 1 |
| 0 | 1 | 1 | 1 | 0 | 0 |
| 0 | 0 | 0 | 0 | 0 | 0 |

(b)

| 0 | 0 | 0 | 0 | 0 | 0 |
|---|---|---|---|---|---|
| 0 | 1 | 1 | 0 | 0 | 0 |
| 0 | 1 | 1 | 1 | 1 | 1 |
| 0 | 1 | 1 | 1 | 1 | 1 |
| 0 | 1 | 1 | 1 | 1 | 1 |
| 0 | 1 | 1 | 1 | 0 | 0 |
| 0 | 0 | 0 | 0 | 0 | 0 |

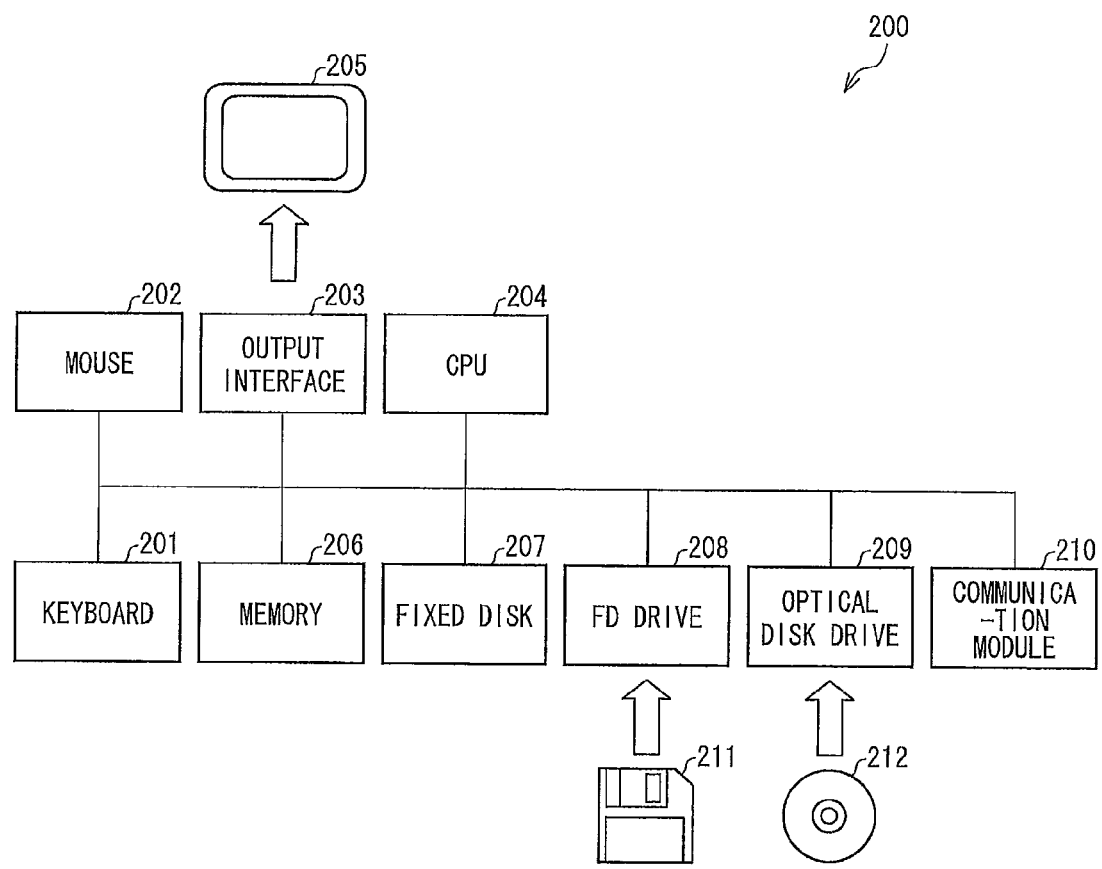
F I G. 3 3

IMAGE PROCESSING DEVICE, IMAGE PROCESSING METHOD, IMAGE PROCESSING PROGRAM, AND RECORDING MEDIUM WITH RECORDED IMAGE PROCESSING PROGRAM

TECHNICAL FIELD

The present invention relates to an image processing device. In particular, the present invention relates to an image processing device which corrects distortion of an image.

BACKGROUND ART

In a case where a subject is captured by the use of a camera from an oblique direction while being looked from downward, a part of the subject far from the camera is slightly distorted. This phenomenon is called "distortion". Japanese Patent Application Publication Tokukaihei No. 8-163427 A (1996) (hereinafter, referred to as Patent Literature 1) discloses an "image pickup device" which corrects distortion by carrying out an image processing to expand a slightly distorted part.

Meanwhile, with the spread of digital cameras, a method is becoming popular in which (i) a document such as that written on paper, (ii) a poster used in an exhibition, (iii) a guide map at a sightseeing spot, or (iv) a whiteboard or a blackboard used in a meeting or the like, is captured for utilizing digital data thereof. It is preferable to obtain captured image data by capturing a subject from the front, in view of easiness in confirmation of contents. Moreover, in a case where characters are read from captured image data by an OCR (optical character reader), the captured image data is preferably obtained by capturing a subject from the front, in view of improvement in recognition accuracy.

However, a subject sometimes cannot be captured from the front due to a physical restriction such as a location of the subject. Alternatively, it is sometimes better to capture a subject from a direction other than the front, by taking into consideration a condition such as a direction of a light source. In such cases, the subject in the captured image data is distorted, and this leads to a difficulty in confirmation of contents or in reading of characters by the OCR. Japanese Patent Application Publication Tokukai No. 2004-40395 A (hereinafter, referred to as Patent Literature 2) discloses an "image distortion correcting device" in which an original aspect ratio and an original projection parameter of a subject in a captured image is calculated based on the subject, which is distorted, in the captured image. Then, the distortion of the captured image is corrected with the use of the original aspect ratio and the original projection parameter thus calculated. Japanese Patent Application Publication Tokukai No. 2008-257713 A (hereinafter, referred to as Patent Literature 3) discloses a "device for correcting document image having distortion in perspective transformation", in which distortion of a captured image (document image) is corrected with the use of line segments detected from the document image.

CITATION LIST

Patent Literatures

[Patent Literature 1]
Japanese Patent Application Publication Tokukaihei No. 8-163427 A (Publication date: Jun. 21, 1996)

[Patent Literature 2]
Japanese Patent Application Publication Tokukai No. 2004-40395 A (Publication date: Feb. 5, 2004)

[Patent Literature 3]
Japanese Patent Application Publication Tokukai No. 2008-257713 A (Publication date: Oct. 23, 2008)

SUMMARY OF INVENTION

Technical Problem

However, according to the device disclosed in Patent Literature 1, a user of the device has to manually adjust a degree of correcting distortion, and an aspect ratio of the subject in the image is not restored. According to the device disclosed in Patent Literature 2, the subject needs to be wholly contained in an imaging area (i.e., it is necessary to identify four apexes of a rectangular subject). However, it is difficult to cause a long and thin subject such as a building or a schedule board to be wholly contained in the imaging area. According to the device disclosed in Patent Literature 3, it is necessary to detect line segments for correcting an image, and a subject is limited to a document image. The device of Patent Literature 3 therefore cannot correct distortion of a subject such as a whiteboard or a guide map, from which line segments cannot be detected.

The present invention is accomplished in view of the problem, and its object is to provide an image processing device which can correct distortion of a subject in a captured image without manually adjusting a degree of correction, even in cases where (i) a part of the subject is not contained in the captured image and (ii) the subject is a whiteboard or the like which is not a document image.

Solution to Problem

In order to attain the object, an image processing device of the present invention includes: a line segment image generating section for generating a line segment image obtained by extracting contour line segments which are line segments contained in a contour of a subject in a captured image; a quadrilateral identifying section for (i) putting at least one virtual line segment in the line segment image generated by the line segment image generating section, (ii) selecting four line segments from a set which contains the at least one virtual line segment and the contour line segments, and (iii) identifying a quadrilateral defined by four straight lines containing respective selected four line segments; and an image correcting section for correcting a distortion in perspective transformation of the captured image based on the quadrilateral identified by the quadrilateral identifying section.

In order to attain the object, an image processing method of the present invention is a method for use in an image processing device, and the image processing method of the present invention includes the steps of: (i) generating a line segment image obtained by extracting contour line segments which are line segments contained in a contour of a subject in a captured image; (ii) (a) putting at least one virtual line segment in the line segment image generated in the step (i), (b) selecting four line segments from a set which contains the at least one virtual line segment and the contour line segments, and (c) identifying a quadrilateral defined by four straight lines containing respective selected four line segments; and correcting a distortion in perspective transformation of the captured image based on the quadrilateral identified in the step (ii).

According to the configuration, the line segment image generating section extracts a contour of the subject from the captured image, which has been obtained by capturing the subject. The line segment image generating section generates a line segment image, which indicates contour line segments, by extracting the contour line segments (each of which is a part of a straight line delimited by two points) contained in the extracted contour.

Note that the subject is assumed to be a subject (e.g., a subject having a rectangular surface or a square surface), which has an outer circumference defined by two sets of substantially parallel line segments, which two sets of line segments form substantially right angles. Moreover, the subject in the captured image is assumed to have at least two sides.

The quadrilateral identifying section (i) puts at least one virtual line segment in the line segment image generated by the line segment image generating section, (ii) selects four line segments from a set which contains the at least one virtual line segment and the contour line segments, and (iii) identifies a quadrilateral defined by four straight lines containing respective selected four line segments. With the process, even in a case where a part of the subject is not contained in the captured image, the virtual line segment can make up for the part of the subject being not contained in the captured image. This makes it possible to virtually form four sides which define an outer circumference of the subject in the captured image.

The image correcting section corrects a distortion in perspective transformation of the captured image based on the quadrilateral identified by the quadrilateral identifying section. The image correcting section corrects the distortion in perspective transformation of the captured image by, for example, correcting the quadrilateral such that the quadrilateral identified by the quadrilateral identifying section has (i) four right angles and (ii) an aspect ratio identical with that of the subject corresponding to the quadrilateral.

With the configuration, it is possible to appropriately correct the distortion in perspective transformation of the captured image, even in a case where a part of the subject is not contained in the captured image or the subject is not a document.

Advantageous Effects of Invention

As above described, the image processing device of the present invention includes: a line segment image generating section for generating a line segment image obtained by extracting contour line segments which are line segments contained in a contour of a subject in a captured image; a quadrilateral identifying section for (i) putting at least one virtual line segment in the line segment image generated by the line segment image generating section, (ii) selecting four line segments from a set which contains the at least one virtual line segment and the contour line segments, and (iii) identifying a quadrilateral defined by four straight lines containing respective selected four line segments; and an image correcting section for correcting a distortion in perspective transformation of the captured image based on the quadrilateral identified by the quadrilateral identifying section.

The image processing method of the present invention is a method for use in an image processing device, and the image processing method of the present invention includes the steps of: (i) generating a line segment image obtained by extracting contour line segments which are line segments contained in a contour of a subject in a captured image; (ii) (a) putting at least one virtual line segment in the line segment image generated in the step (i), (b) selecting four line segments from a set which contains the at least one virtual line segment and the contour line segments, and (c) identifying a quadrilateral defined by four straight lines containing respective selected four line segments; and correcting a distortion in perspective transformation of the captured image based on the quadrilateral identified in the step (ii).

This brings about an effect of appropriately correcting a distortion in perspective transformation of a captured image, even in a case where a part of a subject is not contained in the captured image or the subject is not a document.

Figure 4:
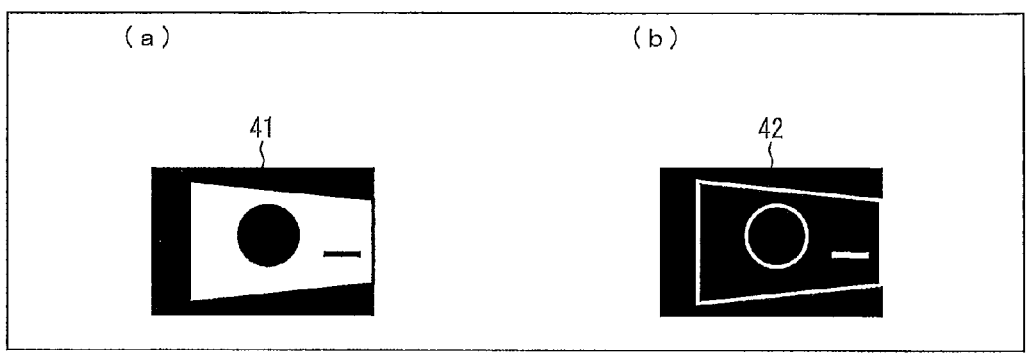

(a) of FIG. 4 is a view illustrating an example of a captured image, and (b) of FIG. 4 is a view illustrating an edge image generated from the captured image illustrated in (a) of FIG. 4.

Figure 5:
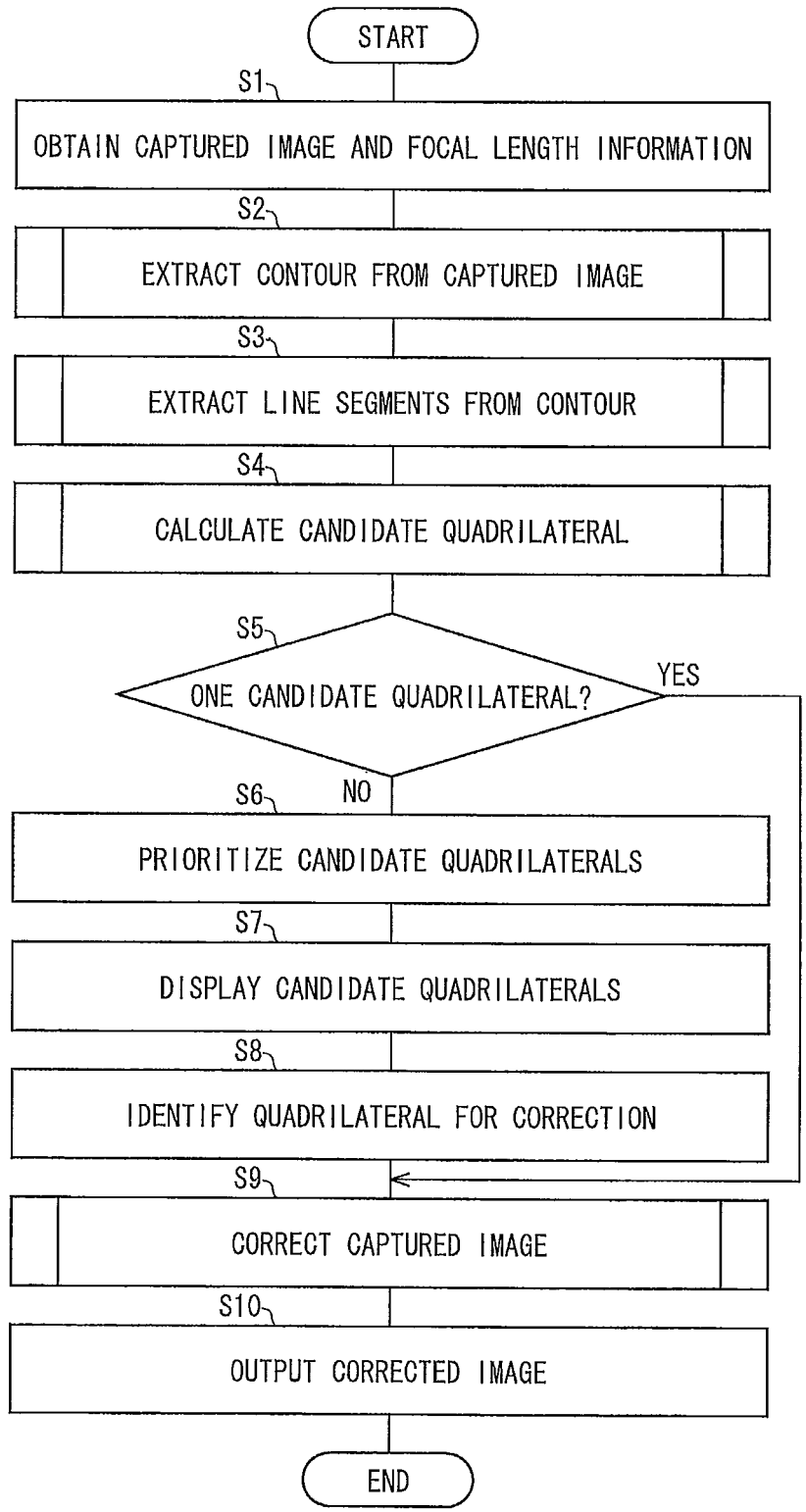

FIG. 5 is a flowchart illustrating an example of a flow of processes in the image processing device.

Figure 6:
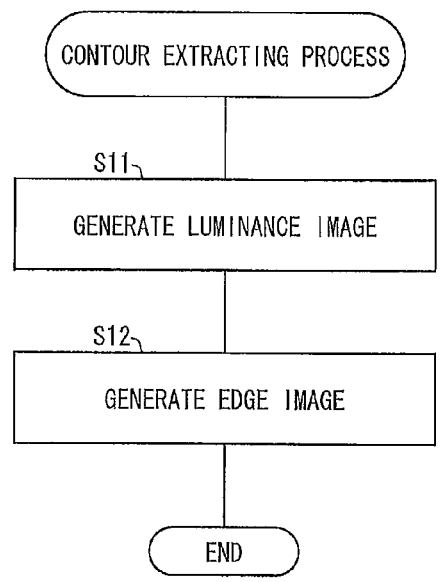

FIG. 6 is a flowchart illustrating an example of a flow of processes carried out by a contour extracting section included in the image processing device.

Figure 7:
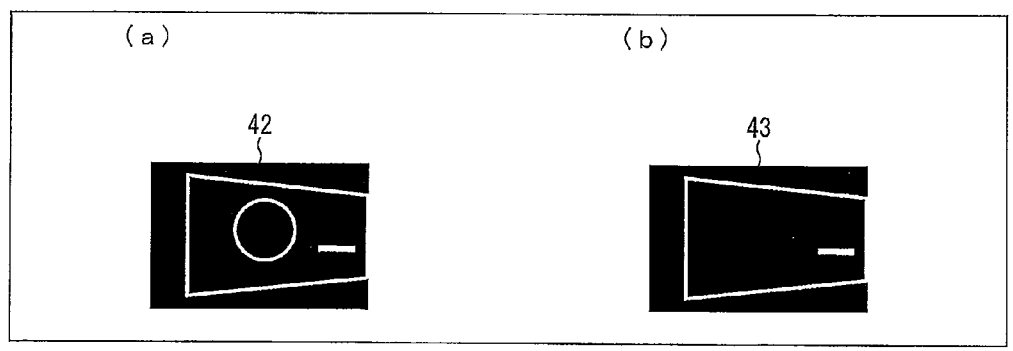

(a) of FIG. 7 is a view illustrating an example of an edge image generated by a contour extracting section, and (b) of FIG. 7 is a view illustrating a line segment image generated from the edge image illustrated in (a) of FIG. 7.

Figure 8:
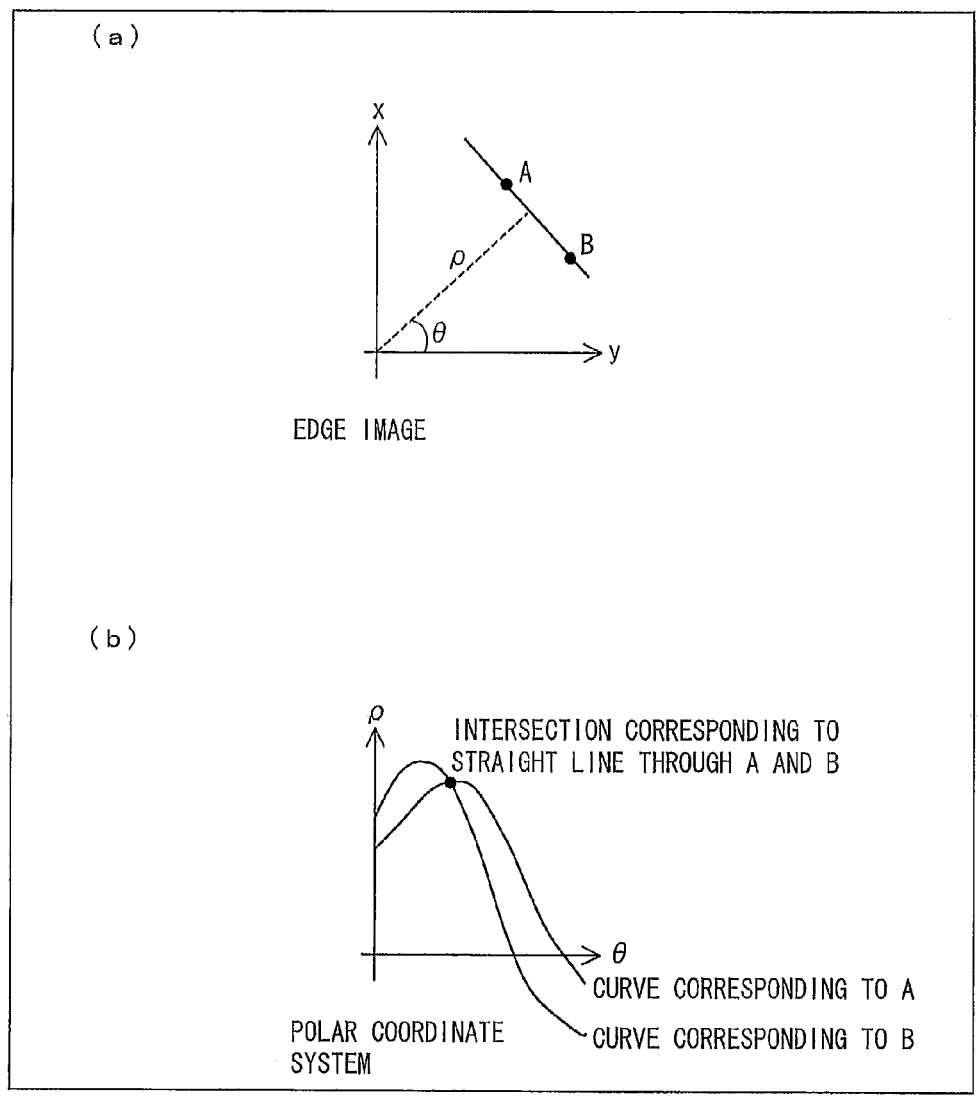

(a) of FIG. 8 is a graph illustrating locations of points A and B in an x-y coordinate system of an edge image, and (b) of FIG. 8 is a graph illustrating curves corresponding to the points A and B which curves are obtained when coordinates (x, y) of the x-y coordinate system are transformed into coordinates ($\rho$, $\eta$) of a polar coordinate system.

FIG. 9 is a view illustrating voting in Hough transformation.

Figure 10:
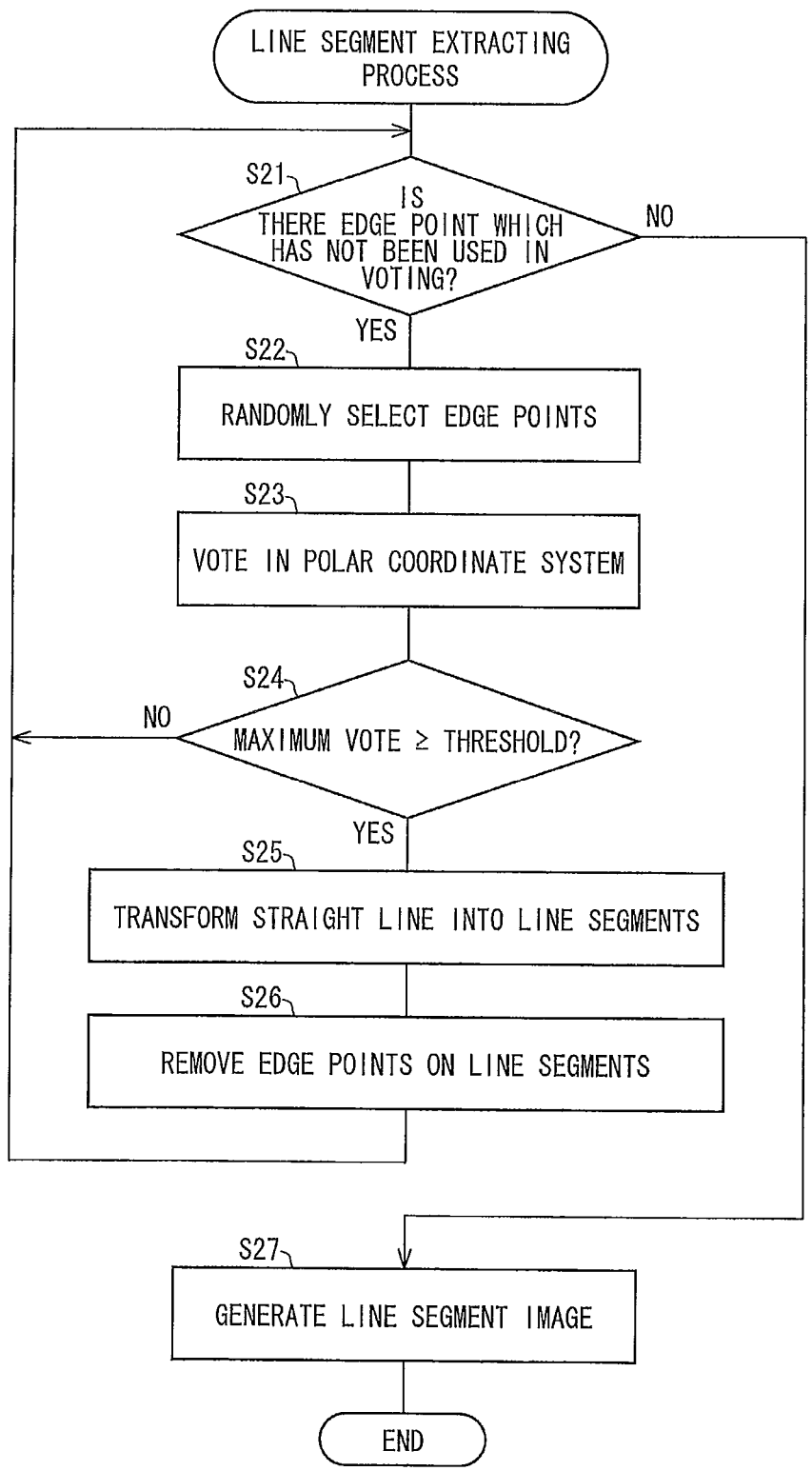

FIG. 10 is a flowchart illustrating an example of a flow of processes carried out by a line segment extracting section included in the image processing device.

FIG. 11 is a view illustrating a line segment image to which four virtual line segments are inserted.

Figure 12:
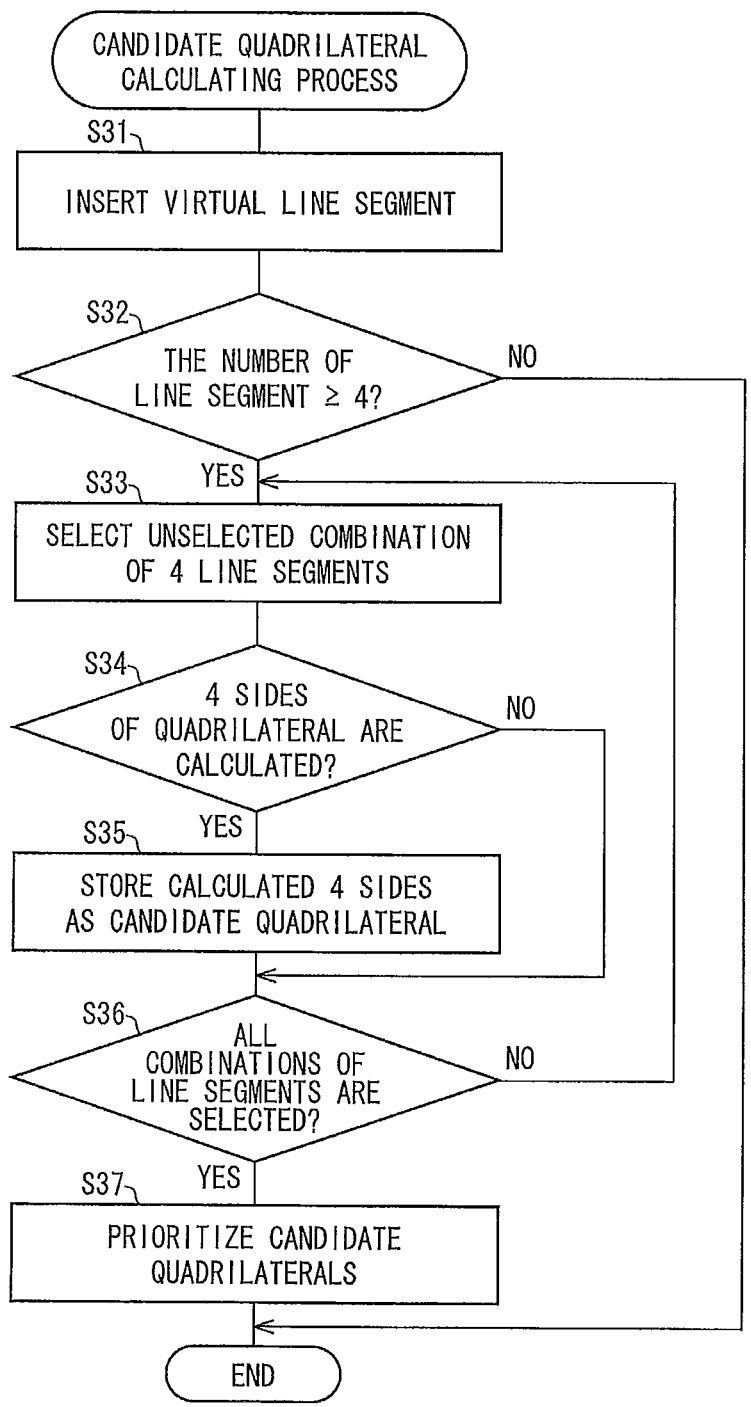

FIG. 12 is a flowchart illustrating an example of a flow of processes carried out by a candidate quadrilateral calculating section included in the image processing device.

Figure 13:
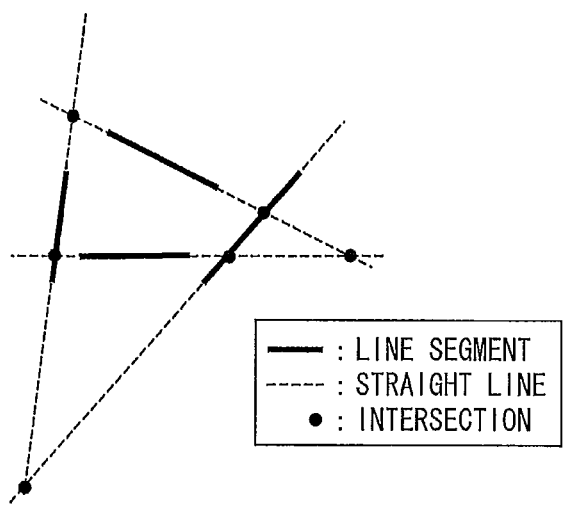

FIG. 13 is a view illustrating straight lines which define four sides of a candidate quadrilateral.

Figure 14:
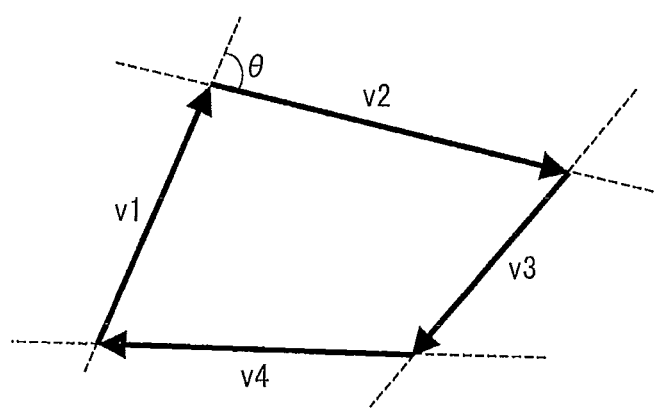

FIG. 14 is an explanatory view for explaining how to judge whether or not a quadrilateral is a convex polygon.

Figure 15:
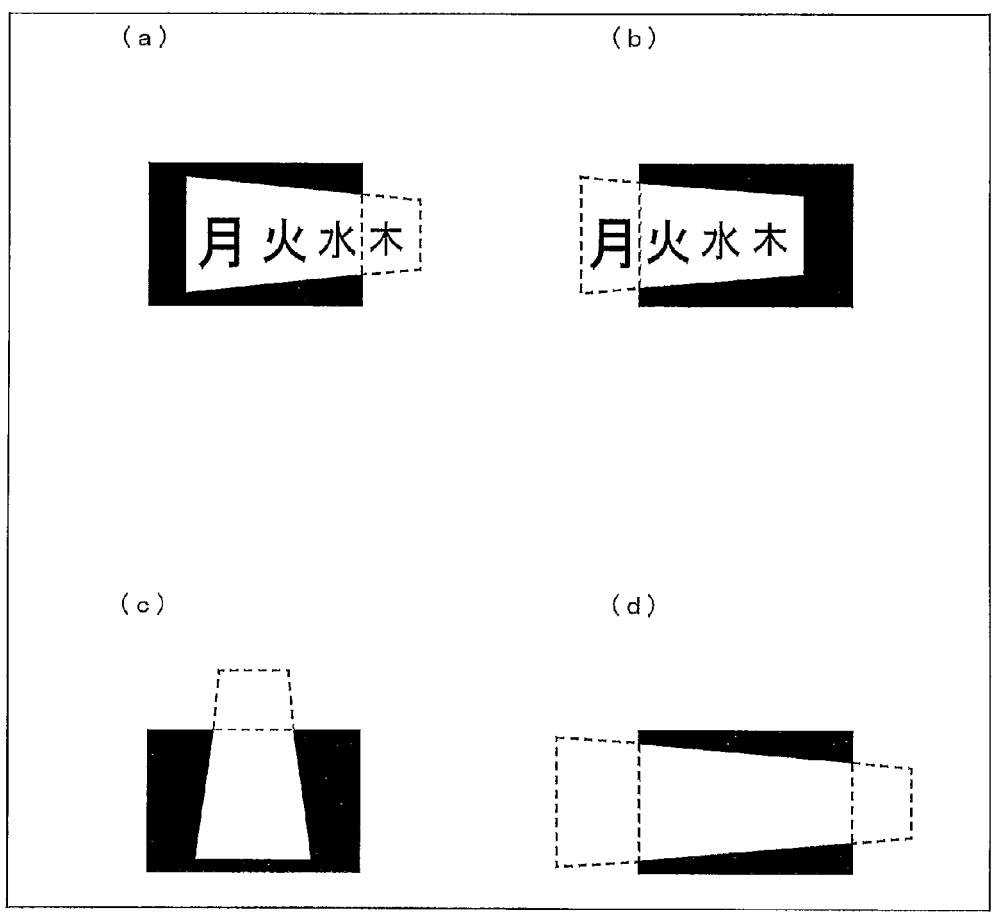

Each of (a) through (d) of FIG. 15 is a view illustrating an example of a captured image in which a subject is not wholly contained.

Figure 16:
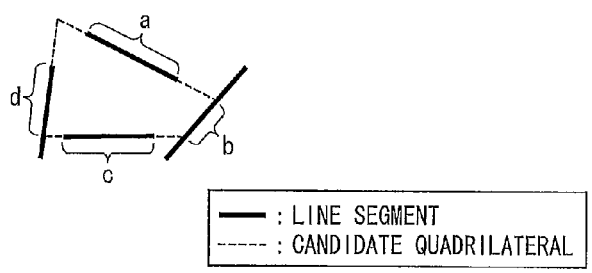

FIG. 16 is an explanatory view for explaining an evaluation value for a candidate quadrilateral.

Figure 17:
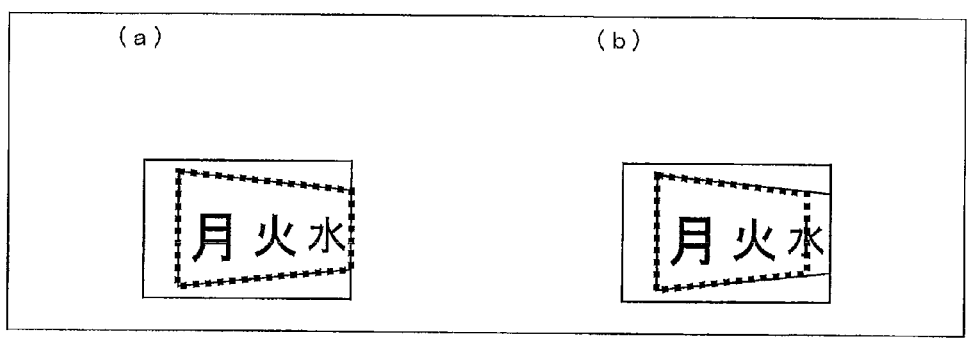

(a) and (b) of FIG. 17 are views illustrating a concrete example of candidate quadrilaterals to which different evaluation values are given.

Figure 18:
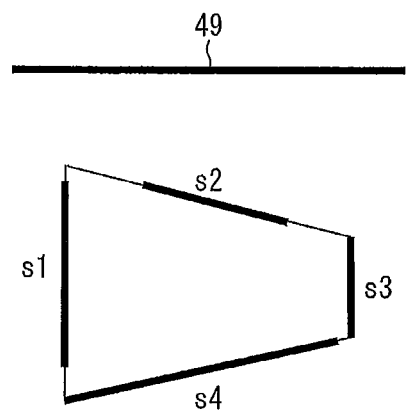

FIG. 18 is an explanatory view for explaining importance of giving a lower evaluation value to a virtual line segment.

Figure 19:
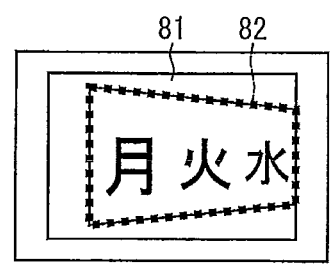

FIG. 19 is a view illustrating an example of how a monitor displays a captured image and a candidate quadrilateral.

Figure 20:
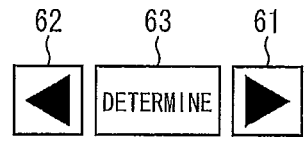

FIG. 20 is a view illustrating an example of an operating button.

Figure 21:
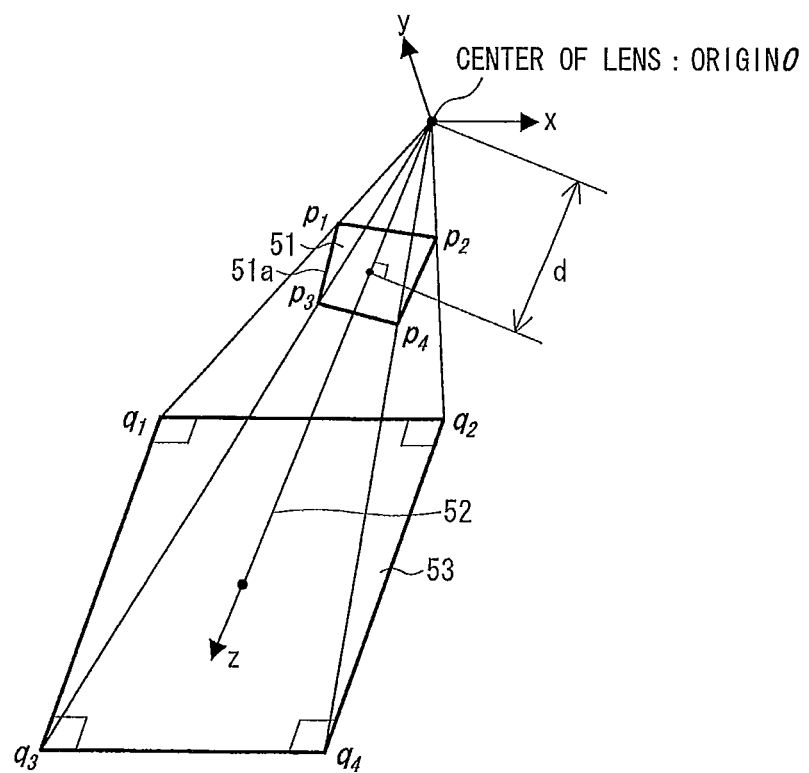

FIG. 21 is a view illustrating a positional relation between objects in perspective transformation.

Figure 22:
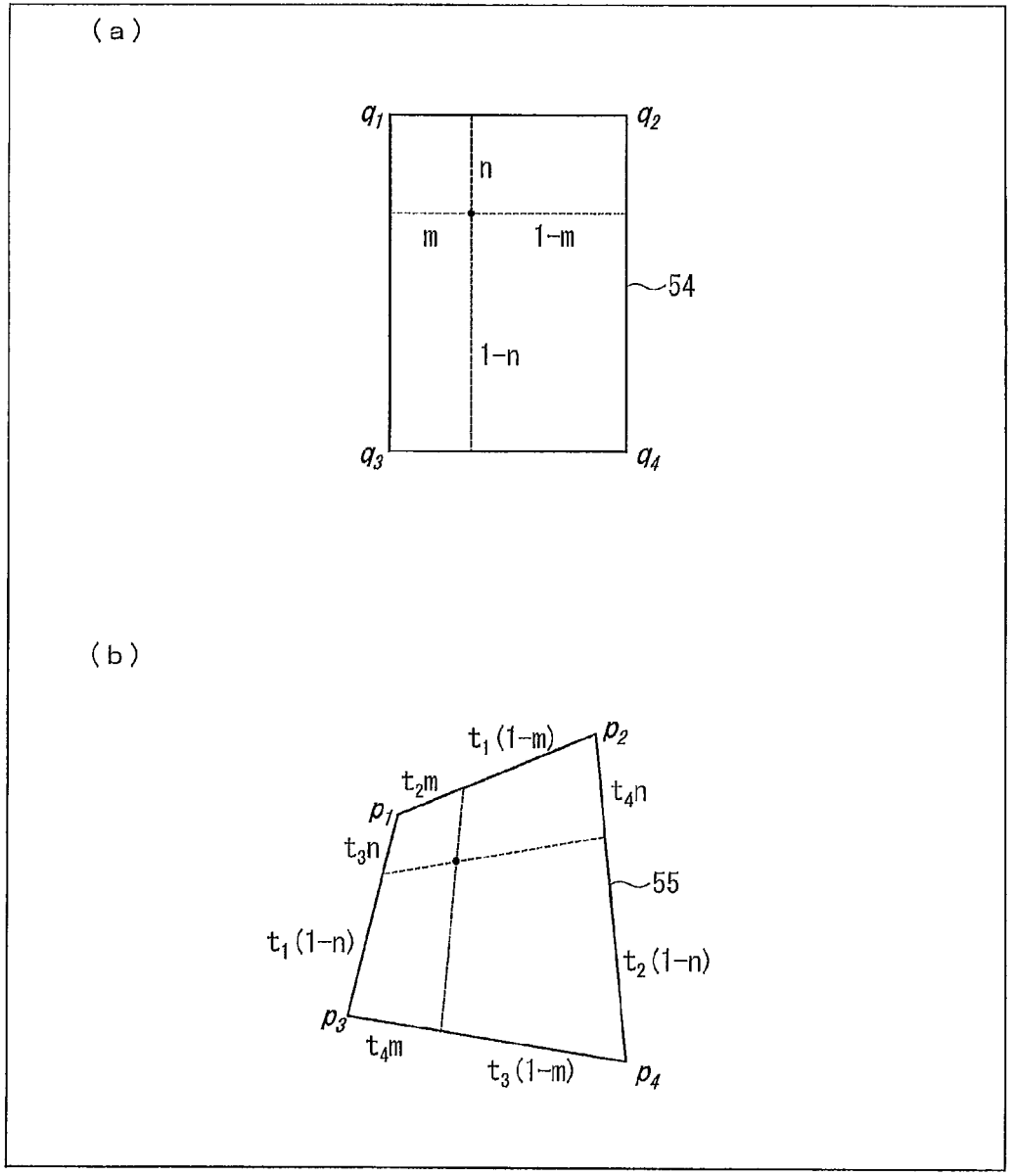

(a) of FIG. 22 is a view illustrating an example of a corrected image, and (b) of FIG. 22 is a view illustrating an example of a quadrilateral contained in an image to be corrected.

Figure 23:
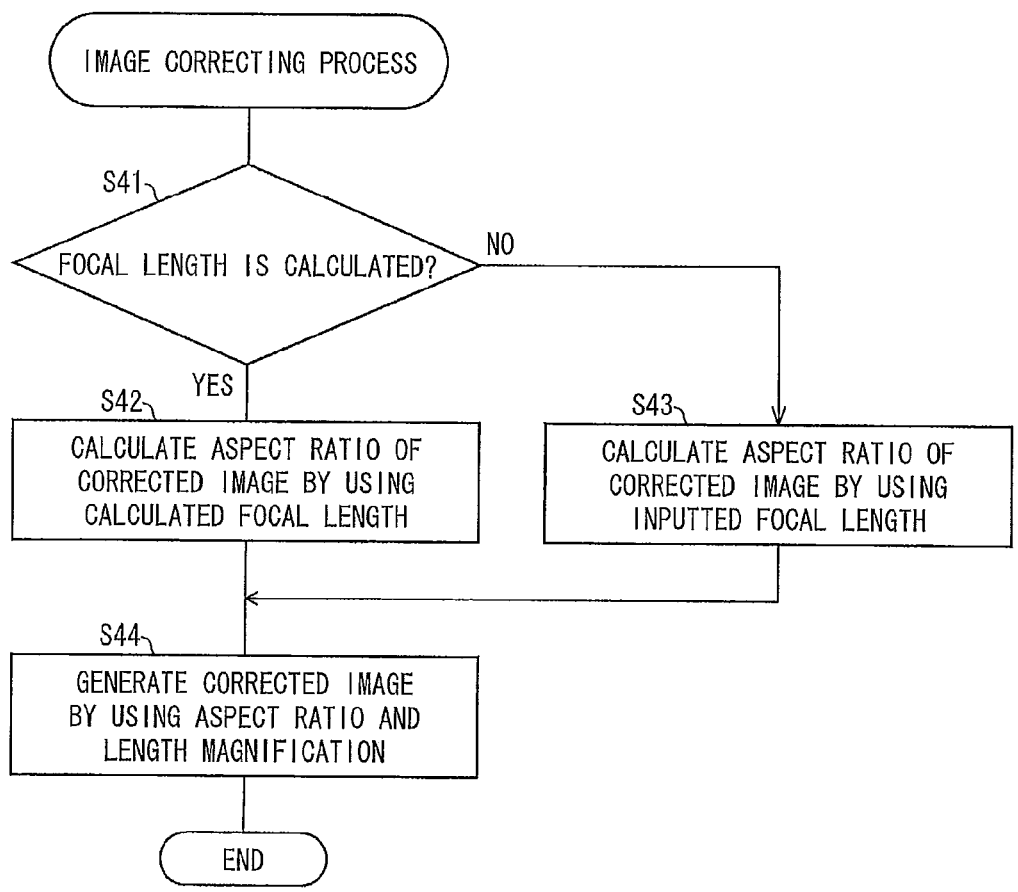

FIG. 23 is a flowchart illustrating an example of a flow of processes carried out by an image correcting section included in the image processing device.

Figure 24:
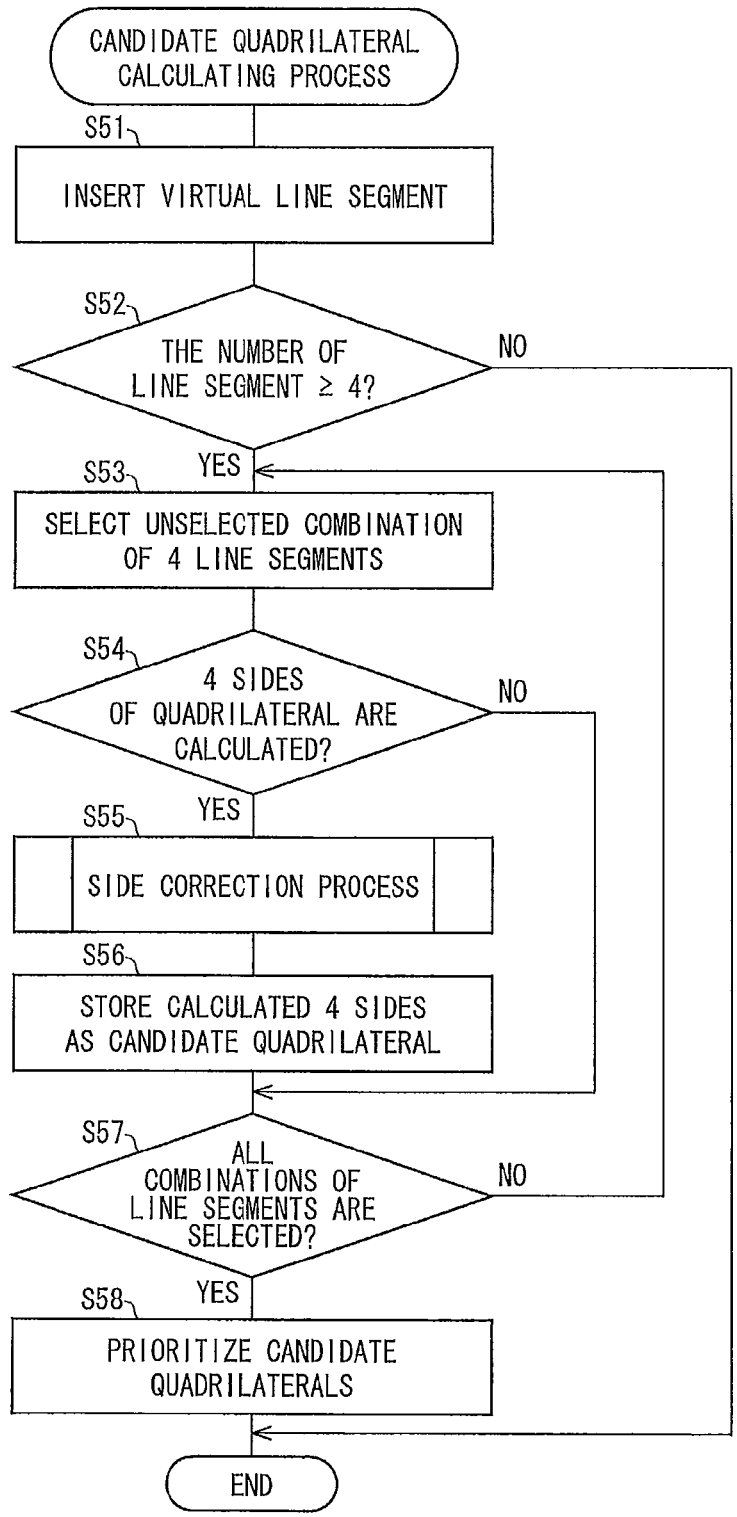

FIG. 24 is a flowchart illustrating an example of a flow of processes carried out by a candidate quadrilateral calculating section included in an image processing device, in accordance with another embodiment of the present invention.

Figure 25:
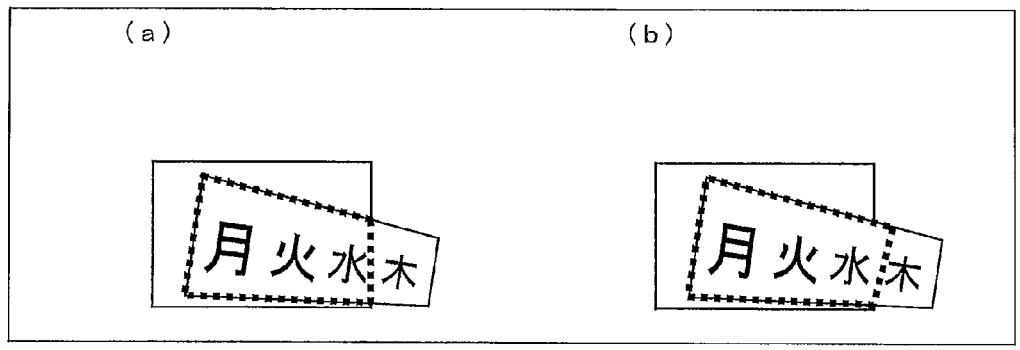

(a) of FIG. 25 is a view illustrating a quadrilateral before a location of a side of the quadrilateral is corrected, and (b) of FIG. 25 is a view illustrating the quadrilateral after the location of the side is corrected.

Figure 26:
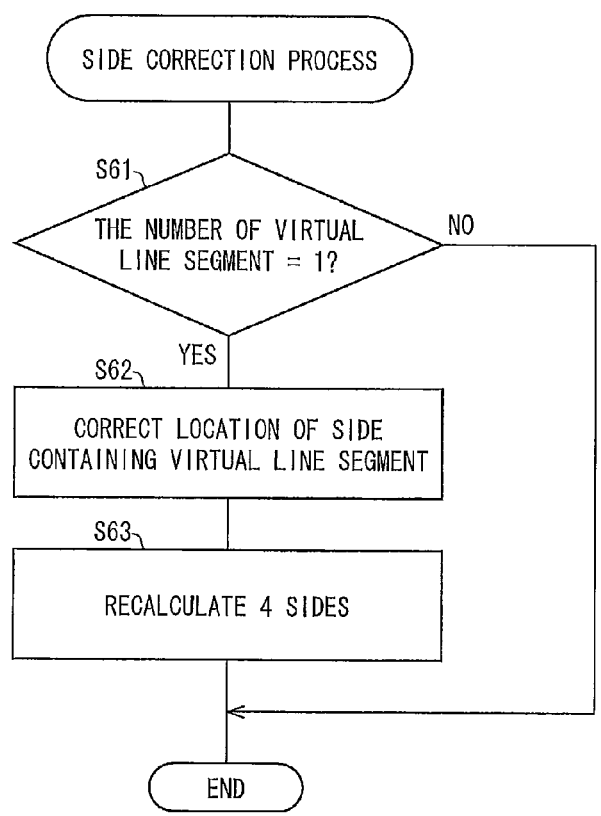

FIG. 26 is a flowchart illustrating an example of a flow of a side correction process carried out by a candidate quadrilateral calculating section.

Figure 27:
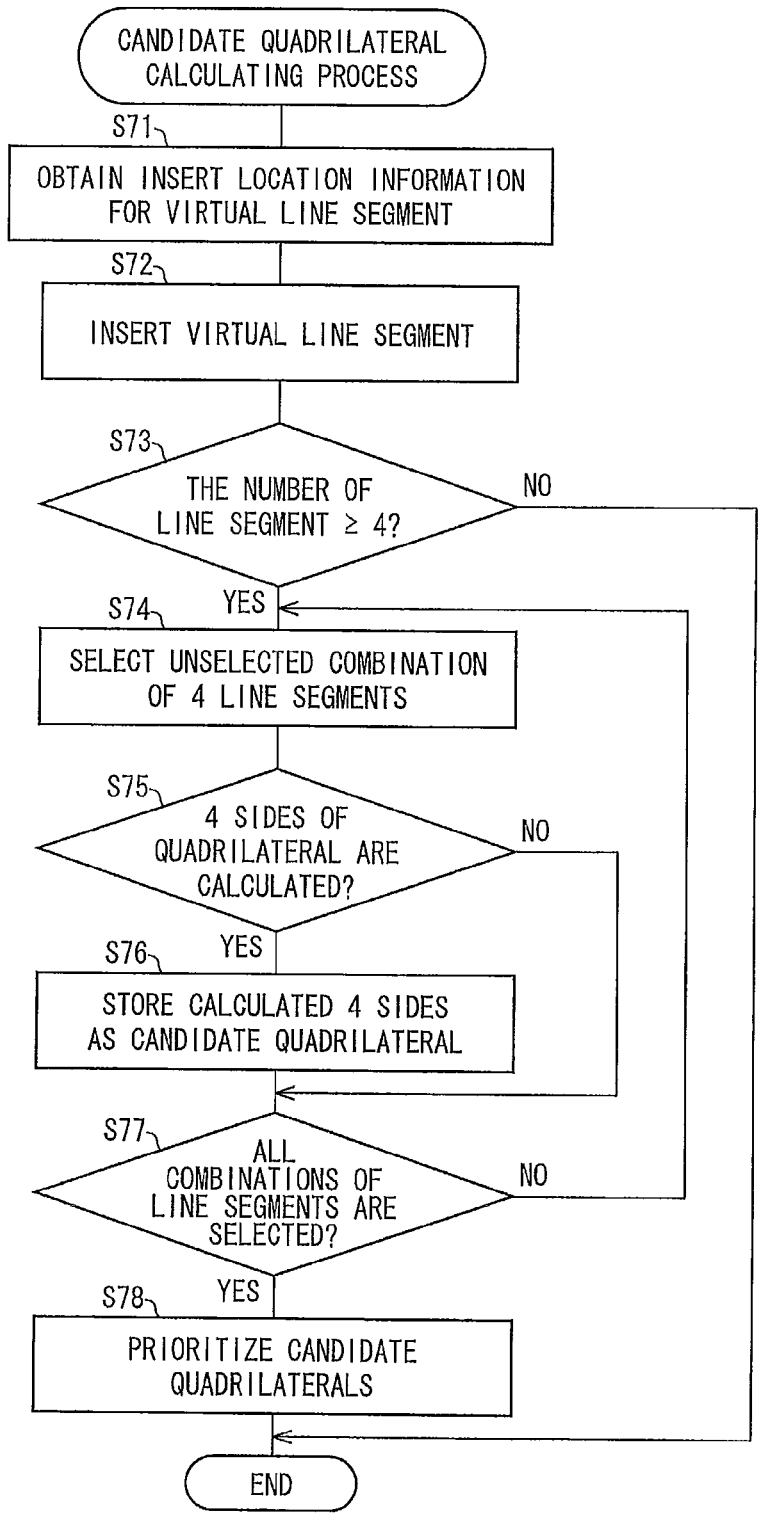

FIG. 27 is a flowchart illustrating an example of a flow of processes carried out by a candidate quadrilateral calculating section included in an image processing device, in accordance with yet another embodiment of the present invention.

Figure 28:
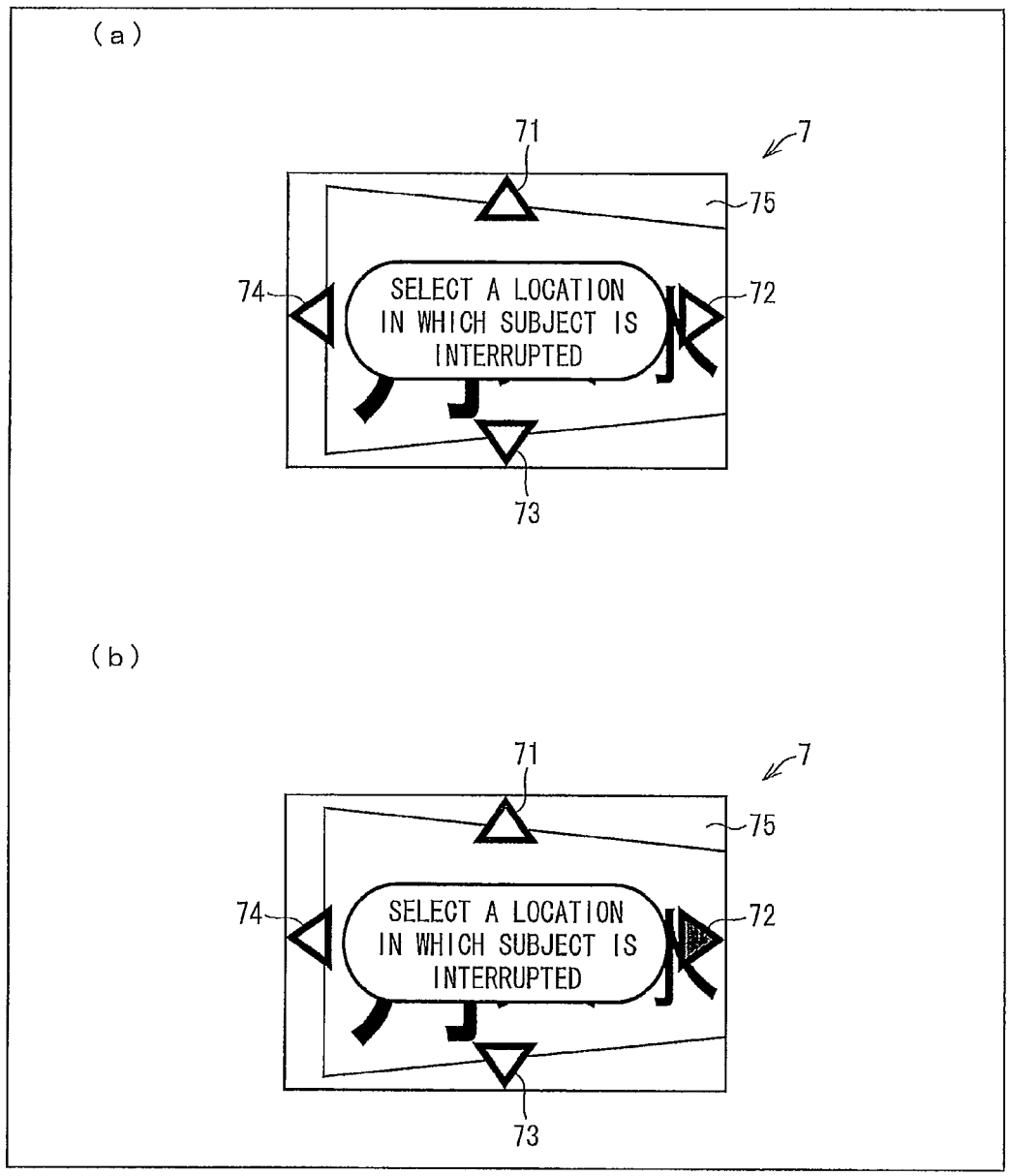

(a) of FIG. 28 is a view illustrating an example of a display screen of a monitor for selecting a virtual line segment, and (b) of FIG. 28 is a view illustrating a display screen of the monitor in which a virtual line segment at a rightmost side has been selected.

Figure 29:
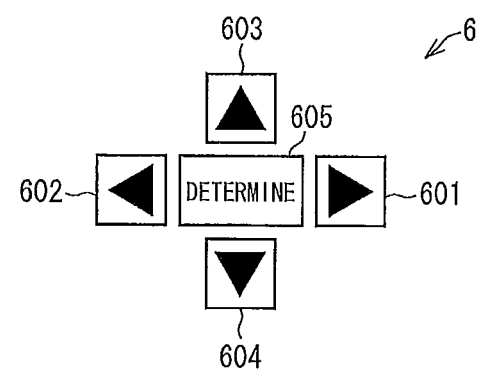

FIG. 29 is a view illustrating an example of an operating button for inputting a location in which a virtual line segment is to be inserted.

Figure 30:
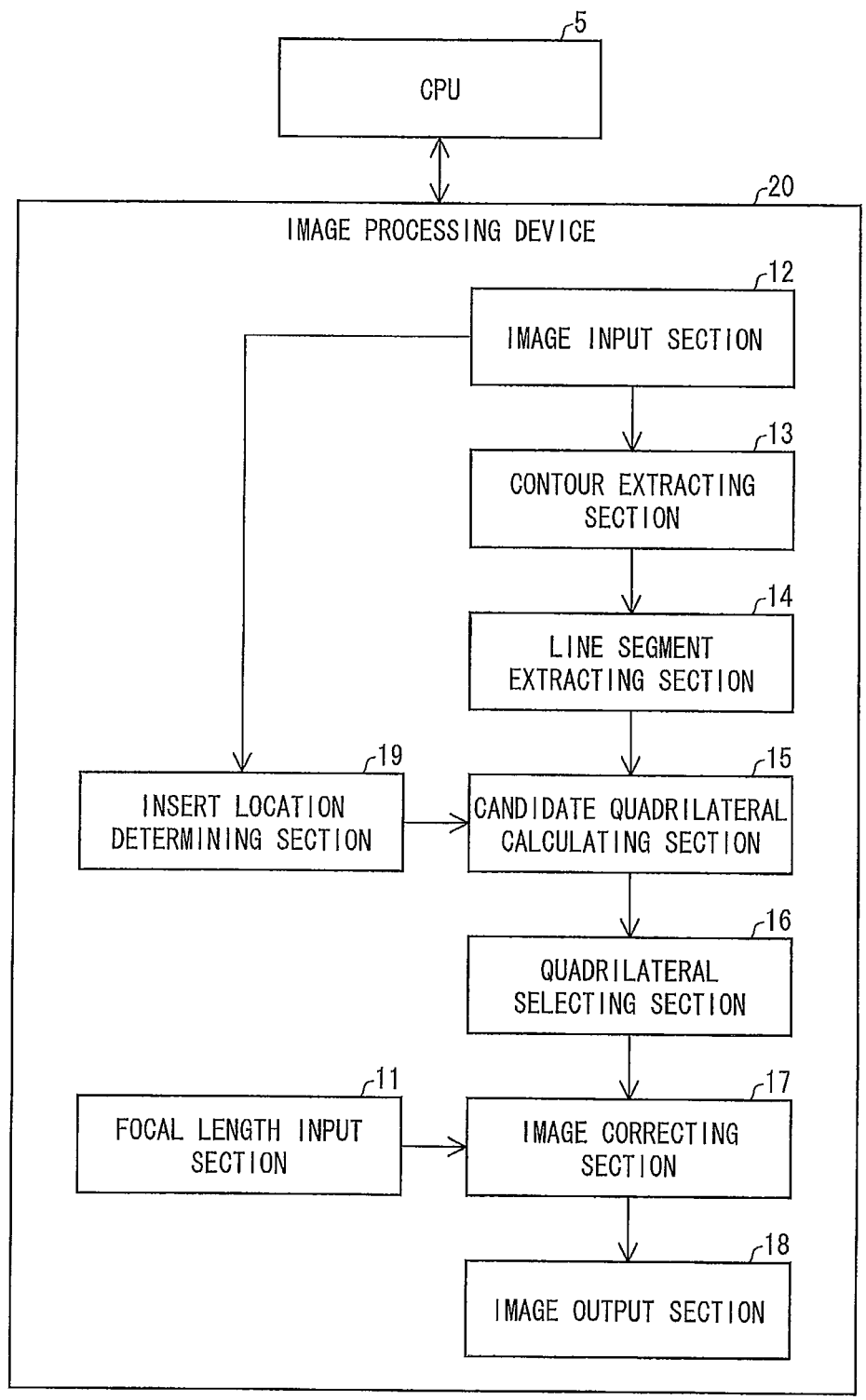

FIG. 30 is a block diagram illustrating a configuration of an image processing device, in accordance with still another embodiment of the present invention.

Figure 31:
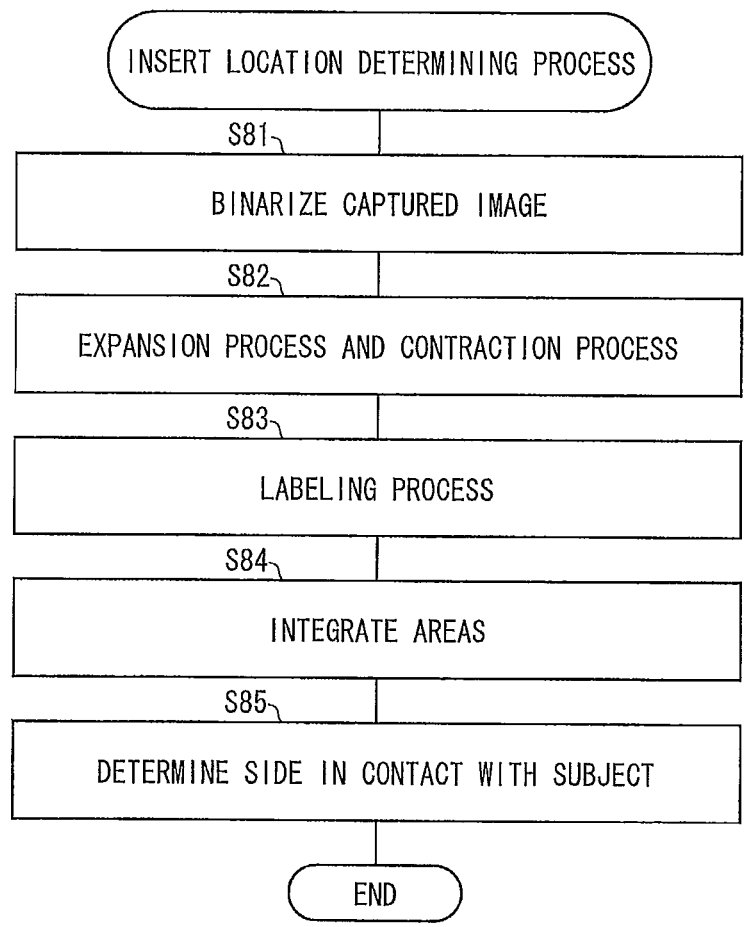

FIG. 31 is a flowchart illustrating an example of a flow of processes carried out by an insert location determining section included in the image processing device.

Each of (a) and (b) of FIG. 32 is an explanatory view for explaining an insert location determining process carried out by the insert location determining section.

FIG. 33 is a view illustrating a configuration of a computer, in accordance with yet another embodiment of the present invention.

DESCRIPTION OF EMBODIMENTS

Embodiment 1

The following description will discuss an embodiment of the present invention, with reference to FIGS. 1 through 23. Specifically, the following description will discuss a case where the image processing device of the present embodiment is applied to a digital camera. Note, however, that the image processing device of the present embodiment is not limited to a specific one such as the digital camera, provided that it (i) obtains captured image data from its built-in image capturing device or from an external device and (ii) processes the captured image data. Examples of the image processing device encompass a scanner, a printer, and a mobile phone.

(1. Description of Functions of Digital Camera 100)

Figure 2:
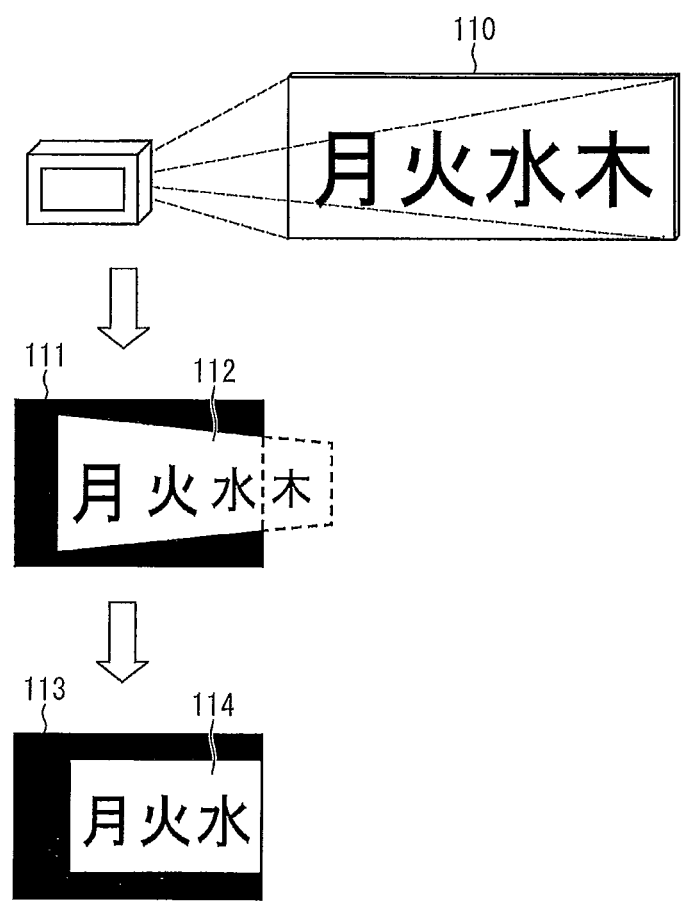
FIG. 2 is an explanatory view for explaining a function of a digital camera, in accordance with an embodiment of the present invention.

FIG. 2 is an explanatory view for explaining a function of a digital camera 100 in accordance with Embodiment 1. In a case where an image of a whiteboard 110 is captured by the digital camera 100 from an oblique direction, a whiteboard image 112 in a captured image 111 will be distorted. In a case where a large subject, such as a schedule board, is captured, part of the large subject is sometimes not contained in a captured image. In a case where the digital camera 100 corrects a distorted captured image, it is possible to obtain an image which contains a whiteboard image 114 with no distortion like a corrected image 113. In this case, the digital camera 100 can provide an image with no distortion, especially even in a case where part of a subject is not contained in a captured image.

(2. Configuration of Digital Camera 100)

Figure 3:
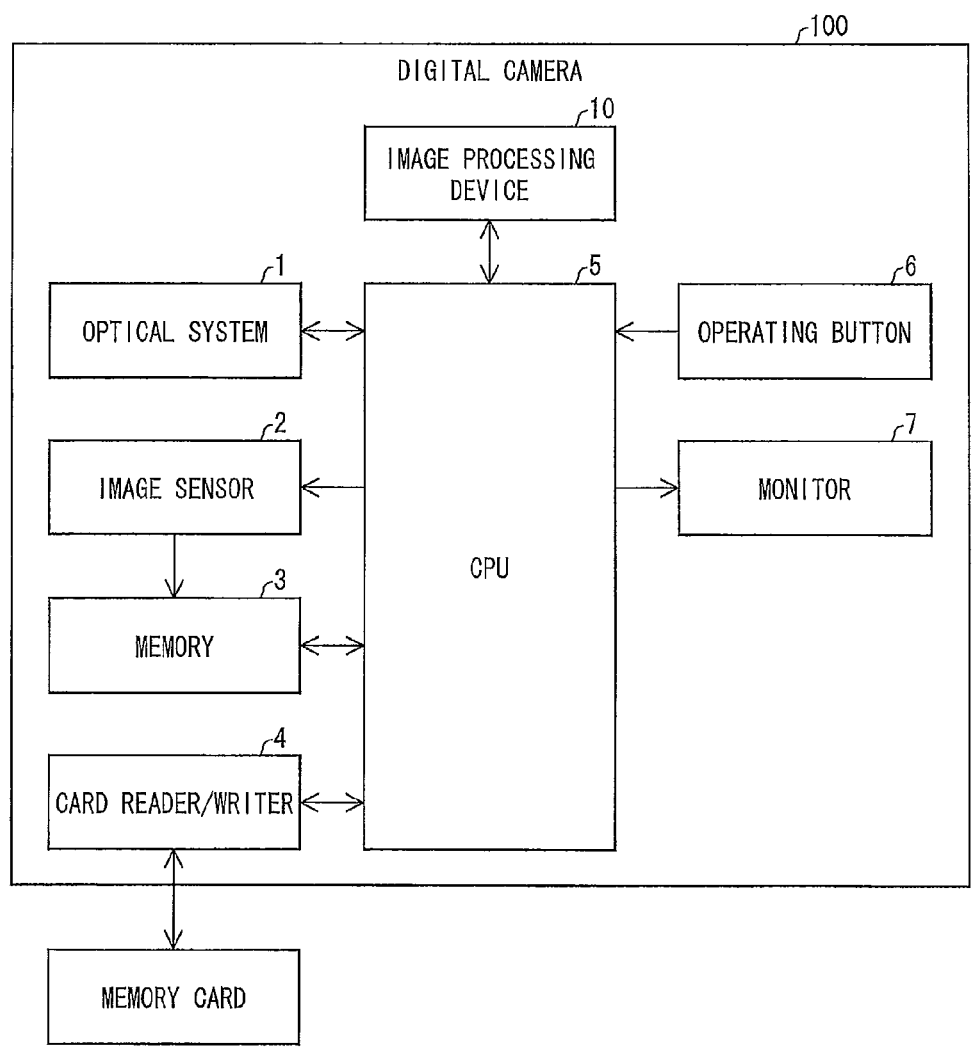
FIG. 3 is a block diagram illustrating a configuration of a digital camera, in accordance with an embodiment of the present invention.

FIG. 3 is a view illustrating a configuration of the digital camera 100. The digital camera 100 includes an optical system 1, an image sensor 2, a memory 3, a card reader/writer 4, a CPU (central processing unit) 5, an operating button 6, a monitor (display section) 7, and an image processing device 10 (see FIG. 3).

The optical system 1 includes (i) a lens (not illustrated) for forming an image of a subject on an image capturing surface of the image sensor 2 and (ii) a lens driving mechanism (not illustrated) for adjusting focal point of the lens. The optical system 1 supplies, to the CPU 5, focal length information indicative of a focal length which is obtained when an image to be captured is captured and is equal to a distance between a center of the lens and the focal point.

The image sensor 2 is an image capturing element whose image capturing surface is made up of a plurality of sensors which are provided in a matrix manner. The image sensor 2 converts, into an image signal, an optical image of a subject which optical image has been formed on the image capturing surface via the optical system 1. Examples of the image sensor 2 encompass a CCD (Charge Coupled Devices) image sensor and a CMOS (Complementary Metal-Oxide-Semiconductor) image sensor. The image sensor 2 generates a captured image, and the captured image is stored in the memory 3.

The memory 3 is a storage section for storing images such as a captured image and a corrected captured image (corrected image). Examples of the memory 3 encompass a semiconductor memory.

The card reader/writer 4 (i) reads out a captured image and/or a corrected image from a memory card 30 or (ii) writes a captured image and/or a corrected image into the memory card 30.

The CPU 5 is a main control section of the digital camera 100. The CPU 5 controls (i) the optical system 1 and the image sensor 2 to capture an image of a subject, (ii) the memory 3 to store a captured image, and (iii) the monitor 7 to display the captured image. Simultaneously, the CPU 5 supplies, to the image processing device 10, the captured image and a focal length of a lens system used during the capturing of an image such that the captured image and the focal length are associated with each other. Subsequently, the CPU 5 (i) receives a corrected image having no distortion from the image processing device 10 and then (ii) controls (a) the memory 3 to store the corrected image and (b) the monitor 7 to display the corrected image. The CPU 5 further controls the card reader/writer 4 to supply the corrected image to the memory card 30.

In another case, the CPU 5 controls (i) the card reader/writer 4 to read out a captured image, which has been captured in the past, from the memory card 30, (ii) the memory 3 to store the captured image, and (iii) controls the monitor 7 to display the captured image. Simultaneously, the CPU 5 supplies the captured image and a focal length to the image processing device 10. The CPU 5 controls (i) the image processing device 10 to supply to the CPU 5 a corrected image having no distortion and (ii) the memory 3 to store the corrected image. The CPU 5 further controls (i) the monitor 7 to display the corrected image and (ii) the card reader/writer 4 to supply the corrected image to the memory card 30.

In a case where a focal length is changed by, for example, zooming in or out, such a changed focal length can be embedded in data of a captured image obtained when an image is captured. In general, data of an image captured by a digital camera contains (i) data of a captured image itself and (ii) information called "Exif". A focal length can be contained in the Exif.

The monitor 7 is a display section for displaying images such as a captured image and/or a corrected image. Examples of the monitor 7 encompass a liquid crystal display.

The operating button 6 is an instruction input section for accepting an instruction of a user who operates the digital camera 100. The operating button 6 can be realized by a soft key displayed on the monitor 7 serving as a touch panel.

(3. Configuration of Image Processing Device 10)

Figure 1:
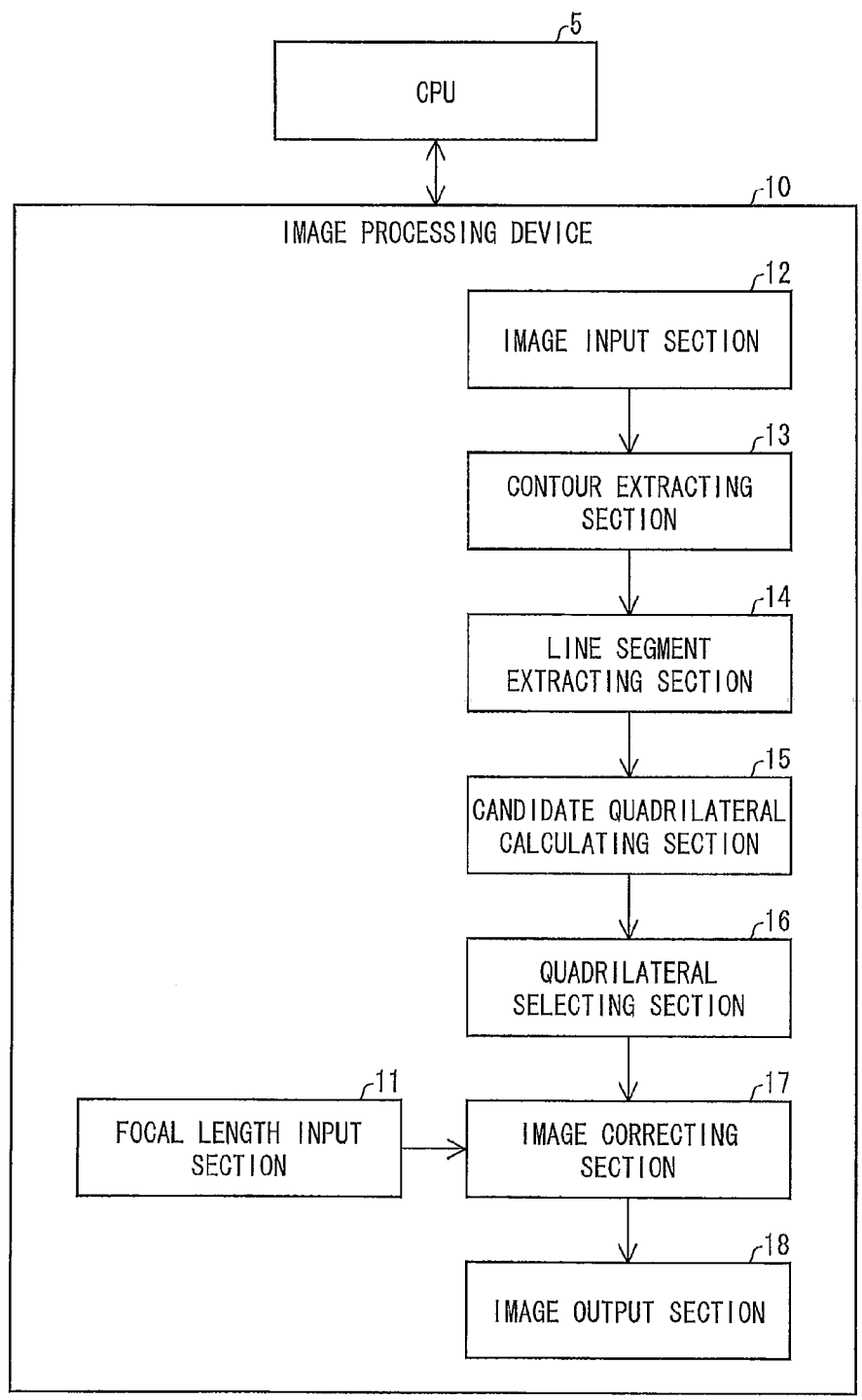
FIG. 1 is a block diagram illustrating a configuration of an image processing device, in accordance with an embodiment of the present invention.

FIG. 1 is a block diagram illustrating a configuration of the image processing device 10. The image processing device 10 includes a focal length input section 11, an image input section 12, a contour extracting section (line segment image generating section) 13, a line segment extracting section (line segment image generating section) 14, a candidate quadrilateral calculating section (quadrilateral specifying section, prioritizing section) 15, a quadrilateral selecting section 16, an image correcting section 17, and an image output section 18 (see FIG. 1).

The focal length input section 11 (i) receives, from the CPU 5, focal length information, which focal length information is indicative of a focal length of a lens system used during the capturing of an image and then (ii) supplies the focal length information to the image correcting section 17.

The image input section 12 (i) receives, from the CPU 5, a captured image which has been generated by the image sensor 2 and then (ii) supplies the captured image to the contour extracting section 13.

The contour extracting section 13 generates an edge image 42, by extracting a contour of a subject in a captured image 41, which has been received from the image input section 12 (see (a) and (b) of FIG. 4). Note that (a) of FIG. 4 is a view illustrating an example of a captured image and (b) of FIG. 4 is a view illustrating an edge image generated from the captured image illustrated in (a) of FIG. 4. Note that the edge image is an image obtained by connecting points, at each of which luminance value is drastically (inconsecutively) changed in an image to be processed (i.e., a captured image). Examples of the edge image encompass a curved line and a line segment indicative of an edge (boundary) of a subject in the image to be processed.

The line segment extracting section 14 (i) extracts contour line segments, which are line segments contained in a contour of the subject, from the edge image generated by the contour extracting section 13 and (ii) generates a line segment image showing the contour line segments.

The contour extracting section 13 and the line segment extracting section 14 serve as a line segment image generating section for generating a line segment image obtained by extracting, from a captured image in which a subject has been captured, contour line segments which are line segments contained in contour of an image of a subject.

The candidate quadrilateral calculating section 15 (i) puts at least one virtual line segment in the line segment image generated by the line segment extracting section 14, (ii) selects four line segments from a set containing (a) the contour line segments and (b) the at least one virtual line segment, and (iii) specifies a quadrilateral (candidate quadrilateral) identified by four straight lines containing the respective four line segments.

Note that the candidate quadrilateral calculating section 15 puts at least one virtual line segment in the line segment image such that (i) the at least one virtual line segment extends along (in parallel with) at least one of four sides defining an outer circumference of a line segment image or (ii) the at least one virtual line segment and the at least one of four sides overlap each other. Although at least one virtual line segment is put in the line segment image generated by the line segment extracting section 14, it is preferable that four virtual line segments are put in the respective four sides defining the outer circumference of the line segment image (i.e., it is preferable to put four virtual line segments in the line segment image), in order to certainly make up for a lacking part of a subject in a captured image. In such a case, the candidate quadrilateral calculating section 15 puts four virtual line segments in the respective four sides defining the outer circumference of the line segment image.

In a case where the candidate quadrilateral calculating section 15 identifies a plurality of candidate quadrilaterals, the candidate quadrilateral calculating section 15 prioritizes identified plurality of candidate quadrilaterals in accordance with lengths of the contour line segments and the at least one virtual line segment contained in each of the plurality of candidate quadrilaterals.

The quadrilateral selecting section 16 controls the monitor 7 to display a plurality of candidate quadrilaterals, which have been prioritized, in accordance with their priorities so that the user can select a quadrilateral (correcting quadrilateral), which is used to correct a captured image, from the plurality of candidate quadrilaterals. Then, the quadrilateral selecting section 16 accepts, from the user, information for identifying the correcting quadrilateral selected by the user.

The image correcting section 17 corrects distortion in perspective transformation of a captured image based on a correcting quadrilateral selected by the user. Note that, in a case where the candidate quadrilateral calculating section 15 specifies only one candidate quadrilateral, the image correcting section 17 corrects distortion in perspective transformation of the captured image based on the one candidate quadrilateral.

The image output section 18 supplies, to the CPU 5, a captured image (corrected image) which has been corrected by the image correcting section 17. The corrected image is displayed on the monitor 7 and is stored in the memory 3.

(Process Flow in Image Processing Device 10)

The following description will briefly discuss a flow of how the image processing device 10 processes. Each of the processes will be described later in detail. Note that the following description will discuss a case where four virtual line segments are put in the line segment image.

FIG. 5 is a flowchart illustrating an example flow of how the image processing device 10 processes. First, when an image to be captured is captured by the optical system 1 and the image sensor 2, (i) a captured image is supplied to the image input section 12 and (ii) focal length information, which is indicative of a focal length of a lens system used during the capturing of an image, is supplied to the focal length input section 11 (step S1).

The image input section 12 supplies the captured image to the contour extracting section 13. The focal length input section 11 supplies the focal length information to the image correcting section 17.

Upon receipt of the captured image from the image input section 12, the contour extracting section 13 generates an edge image showing a contour of a subject in the captured image (step S2). The contour extracting section 13 supplies the edge image to the line segment extracting section 14.

The line segment extracting section 14 (i) extracts contour line segments from the contour of the subject in the edge image and (ii) generates a line segment image showing the contour line segments (step S3). The line segment extracting section 14 supplies the line segment image to the candidate quadrilateral calculating section 15.

The candidate quadrilateral calculating section 15 (i) puts four virtual line segments in respective four sides defining an outer circumference of the line segment image such that the four virtual line segments extend along the respective four sides, (ii) selects four line segments from a set containing (a) the contour line segments which are contained in the line segment image and (b) the four virtual line segments, and (iii) calculates a candidate quadrilateral defined by four straight lines containing the respective four line segments (step S4). Note that the candidate quadrilateral calculating section 15 calculates a candidate quadrilateral which satisfies requirements later described.

In a case where the candidate quadrilateral calculating section 15 calculates a plurality of candidate quadrilaterals (YES in step S5), the candidate quadrilateral calculating section 15 prioritizes the plurality of candidate quadrilaterals in accordance with lengths of the contour line segments and the virtual line segments contained in each of the plurality of candidate quadrilaterals (step S6). The candidate quadrilateral calculating section 15 supplies, to the quadrilateral selecting section 16, information indicative of the plurality of candidate quadrilaterals which have been prioritized.

The quadrilateral selecting section 16 (i) controls the monitor 7 to sequentially display the plurality of candidate quadrilaterals, which have been prioritized, together with the captured image so that the user can select a correcting quadrilateral (step S7) and (ii) obtains, via the operating button 6, information specifying the correcting quadrilateral (correcting quadrilateral specifying information) which has been selected by the user (step S8). The quadrilateral selecting section 16 supplies, to the image correcting section 17, the correcting quadrilateral specifying information.

On the other hand, in a case where the candidate quadrilateral calculating section 15 calculates only one candidate quadrilateral (NO in step S5), the candidate quadrilateral calculating section 15 supplies, to the image correcting section 17, correcting quadrilateral specifying information which specifies the one candidate quadrilateral.

The image correcting section 17 corrects the captured image based on a principle of perspective transformation, with the use of a quadrilateral indicated by correcting quadrilateral specifying information supplied from the candidate quadrilateral calculating section 15 or the quadrilateral selecting section 16 (step S9). In a case where the image correcting section 17 cannot calculate a focal length based on the captured image, the image correcting section 17 corrects the captured image with the use of focal length information obtained by the focal length input section 11.

The image output section 18 supplies, to the CPU 5, the captured image which has been corrected by the image correcting section 17 (step S10).

Note that the present embodiment can be configured as follows: that is, (i) the edge image and the line segment image, which have been generated by the contour extracting section 13 and the line segment extracting section 14, respectively, are stored in a memory available to each of the sections of the image processing device 10 and (ii) each of the function blocks, which requires the edge image and/or the line segment image, obtains the edge image and/or the line segment image from the memory.

(Details of Process Carried Out by Contour Extracting Section 13)

FIG. 6 is a flowchart illustrating an example flow of how the contour extracting section 13 processes. First, the contour extracting section 13 generates a luminance image from the captured image received from the image input section 12 (step S11). The luminance image is a monochrome shading image obtained by extracting only luminance information from the captured image and (ii) contains no color information. In a case where (i) coordinates (x, y) of values (luminance) of R (red), G (green), and B (blue) of the captured image are expressed as "r(x, y)", "g(x, y)", and "b(x, y)", respectively, and (ii) coordinates (x, y) of luminance of the luminance image is expressed as L value, a luminance "l(x, y)" is expressed as Formula (1) below:

$$l(x,y)=c1 \times r(x,y)+c2 \times g(x,y)+c3 \times b(x,y) \quad (1)$$

In Formula (1), "c1", "c2", and "c3" are coefficients. In order to obtain a luminance image, all the "c1", "c2", and "c3" are set to, for example, ⅓, and an average of the values of R, G, and B is calculated. Alternatively, Y value of a YUV format can be calculated by setting the "c1", "c2", and "c3" to 0.299, 0.587, and 0.114, respectively.

Next, the contour extracting section 13 generates an edge image from the luminance image (step S12). The edge image can be generated by a method using an image processing filter such as a Sobel filter or a Prewitt filter. The following description will discuss a method in which a Sobel filter is used. According to the method using the Sobel filter, an edge intensity is calculated based on a first derivative value which is an amount of change in luminance in each of x and y directions. Coordinates (x, y) of the edge image, i.e., "e(x, y)" is expressed by Formulae (2a), (2b), and (2c) below, with the use of coordinates (x, y) of the luminance image, i.e., "l(x, y)".

$$\Delta x=-1 \times l(x-1,y-1)-2 \times l(x-1,y)-1 \times l(x-1,y+1)+1 \times l(x+1,y-1)+2 \times l(x+1,y)+1 \times l(x+1,y+1) \quad (2a)$$

$$\Delta y=-1 \times l(x-1,y-1)-2 \times l(x,y-1)-1 \times l(x+1,y-1)+1 \times l(-1,y+1)+2 \times l(x,y+1)+1 \times l(x+1,y+1) \quad (2b)$$

$$e(x,y)=(\Delta x \times \Delta x+\Delta y \times \Delta y)_{1/2} \quad (2c)$$

Note, however, that, in a case where the edge intensity "e(x, y)" for eliminating a noise is smaller than a predetermined threshold, the edge intensity "e(x, y)" is set to zero.

(Details of Process Carried Out by Line Segment Extracting Section 14)

The line segment extracting section 14 generates, prior to extracting a quadrilateral, a line segment image 43 by extracting line segments from an edge image 42 (see (a) and (b) of FIG. 7). (a) of FIG. 7 is a view illustrating an example of an edge image generated by the contour extracting section 13. (b) of FIG. 7 is a view illustrating a line segment image generated from the edge image illustrated in (a) of FIG. 7. The line segments are extracted by the use of Hough transformation. In the Hough transformation, the coordinates (x, y) of the edge image are transformed into coordinates (ρ, θ) of a polar coordinate system. Specifically, the coordinates (x, y) are transformed into the coordinates (ρ, θ) in accordance with Formula (3) below.

$$\rho=x\cos\theta+y\sin\theta \quad (3)$$

(a) and (b) of FIG. 8 illustrate the transformation carried out based on Formula (3). (a) of FIG. 8 is a graph illustrating locations of respective points A and B of the edge image in an x-y coordinate system. (b) of FIG. 8 is a graph illustrating two curves corresponding to the respective points A and B, which two curves are obtained when coordinates (x, y) of each of the points A and B in the x-y coordinate system are transformed into coordinates (ρ, θ) of the polar coordinate system. The points A and B in the edge image correspond to the respective two curves in the polar coordinate system. A straight line through the points A and B in the edge image corresponds to an intersection of the two curves in the polar coordinate system. Here, "ρ" is equal to a length of a normal vector of the straight line through the points A and B in the edge image, a starting point of the normal vector being points of origin. "θ" is equal to an angle between the normal vector and an x axis. Note that the angle θ falls within a range of 0°≤θ<180°. In a case where the angle θ is more than 180°, the length ρ has a negative sign.

Coordinates of the edge image which are not points of origin are converted into polar coordinates by use of the Hough transformation so that the coordinates which have been subjected to the Hough transformation are voted in the polar coordinate system. The coordinates, in the polar coordinate system which coordinates cause the vote to become a local maximum, correspond to a straight line in the edge image (see FIG. 9). The straight line through the points A and B is thus detected. Note that FIG. 9 is a view illustrating the vote in the Hough transformation.

FIG. 10 is a flowchart illustrating an example flow of how the line segment extracting section 14 processes. The line segment extracting section 14 first confirms whether or not there exists an edge point which has not used in the voting of the Hough transformation (step S21). The "edge point" indicates a pixel whose edge intensity e is not zero in the edge image.

In a case where there exist edge points which have not been used in the voting (YES in step S21), the line segment extracting section 14 randomly selects edge points from the edge points which have not been used in the voting (step S22).

Next, the line segment extracting section 14 carries out voting of selected coordinates of the edge image to coordinates on curves in the polar coordinate system (step S23).

Then, the line segment extracting section 14 confirms whether or not a maximum vote in the step S23 is not less than a predetermined threshold (step S24).

In a case where the maximum vote is not less than the predetermined threshold (YES in step S24), the line segment extracting section 14 (i) regards the maximum vote as a local maximum, (ii) calculates a corresponding straight line and (iii) transforms the straight line into a plurality of line segments (step S25). Specifically, the line segment extracting section 14 (i) scans coordinates on the straight line in the edge image and (ii) extracts, as line segments (contour line segments), respective parts of the straight line in which parts edge points lie in a row. Note, however, that an extremely short line segment is regarded as a noise and is therefore not extracted.

When the line segment extracting section 14 extracts line segments, the line segment extracting section 14 (i) regards edge points on extracted line segments as having been used during detecting of a straight line, (ii) sets, to zero, an edge intensity of each of the edge points on the extracted line segments, and (iii) removes such edge points (step S26). Subsequently, the line segment extracting section 14 repeats the step S21 and subsequent steps.

On the other hand, in a case where the maximum vote is less than the predetermined threshold (NO in the step S24), the line segment extracting section 14 repeats the step S21 and subsequent steps.

Note that, in a case where no edge point remains which has not been used in the voting (NO in step S21), the line segment extracting section 14 generates a line segment image with the use of extracted line segments (step S27), and then ends the process.

(Details of Process Carried Out by Candidate Quadrilateral Calculating Section 15)

The candidate quadrilateral calculating section 15 calculates a plurality of quadrilaterals, specified by line segments contained in a line segment image, as a plurality of candidates for a quadrilateral used to correct a captured image. Note that a virtual line segment is put in an edge of the line segment image, by taking into consideration a case where a subject partially stays in the captured image. FIG. 11 illustrates a line segment image 44 in which virtual line segments 45, 46, 47, and 48 are put. The virtual line segments 45, 46, 47, and 48 are put along respective four sides defining an outer circumference of the line segment image 44 (see FIG. 11).

A length of each of the virtual line segments is not limited to a particular one, and therefore can be substantially equal to or shorter than that of a corresponding one of longer sides and shorter sides of the line segment image. It is preferable that each of the virtual line segments is put in the line segment image 44 so as to be in parallel with a corresponding one of the sides defining the outer circumference of the line segment image. Note, however, that the virtual line segments are not necessarily put like that. This is because an angle between the respective virtual line segments and the respective four sides of the line segment image can be changed, as later described in another embodiment.

FIG. 12 is a flowchart illustrating an example flow of how the candidate quadrilateral calculating section 15 processes. First, the candidate quadrilateral calculating section 15 puts a virtual line segment in a line segment image (step S31). The candidate quadrilateral calculating section 15 puts, for example, (i) two virtual line segments, each having a length identical with a horizontal width of the line segment image, at respective upper and lower edges of the line segment image and (ii) two virtual line segments, having a length identical with a vertical width of the line segment image, in respective right and left edges of the line segment image. Note that the number of the virtual line segments to be put is not limited to four, and therefore the number of the virtual line segments to be put can be any of one to three.

Next, the candidate quadrilateral calculating section 15 confirms whether or not the number of line segments in the line segment image is not less than four, including the virtual line segment (step S32).

In a case where the number of the line segments is less than four (NO in step S32), the candidate quadrilateral calculating section 15 ends the process because no quadrilateral can be defined.

In a case where the number of the line segments is not less than four (YES in the step S32), the candidate quadrilateral calculating section 15 selects four line segments from a set of the line segments containing the virtual line segment (step S33). At this point, the candidate quadrilateral calculating section 15 selects a combination of four line segments, which combination has not been selected so far. After the selection of the four line segments, the candidate quadrilateral calculating section 15 confirms whether or not four sides of a quadrilateral can be calculated based on selected four line segments (step S34).

The following description will specifically discuss how the candidate quadrilateral calculating section 15 carries out such a confirmation. FIG. 13 is a view illustrating four straight lines serving as respective four sides of a candidate quadrilateral. In a case where four line segments are extensions of respective four straight lines, the four straight lines cause a maximum of six intersections (see FIG. 13). Note that, in a case where the number of intersections is less than four, the candidate quadrilateral calculating section 15 determines that four sides of a quadrilateral cannot be calculated based on selected line segments. In a case where the number of intersections is not less than four, a quadrilateral, which has four line segments, serving as respective four sides of the quadrilateral, specified by selected four intersections of four straight lines, can be a candidate quadrilateral if all of the following requirements 1 through 5 are met. In contrast, in a case where one of the requirements 1 through 5 is not met, the candidate quadrilateral calculating section 15 determines that four sides of a candidate quadrilateral cannot be calculated.

Requirement 1: The quadrilateral is a convex polygon.
Requirement 2: A straight line exists between any adjacent two of apexes of the quadrilateral.
Requirement 3: No straight line exists between any facing two of the apexes of the quadrilateral.
Requirement 4: The number of virtual line segment(s) is not more than two.
Requirement 5: In a case where two of the four sides of the quadrilateral contain virtual line segments, the two of the four sides face each other.

In a case where it is determined whether to meet Requirement 1, (i) the four sides of the quadrilateral are taken as respective line segment vectors and (ii) the quadrilateral is determined to be a convex polygon if all vector products of any adjacent two of the line segment vectors have identical signs. FIG. 14 is an explanatory view for explaining how to judge whether or not the quadrilateral is a convex polygon. A vector product (v1×v2) of vectors v1 and v2 is to have a sign identical with that of sin θ. The angle θ is an angle by which the vector v1 is rotated clockwise so that the vector v1 and the vector v2 overlap each other (see FIG. 14). In the example illustrated in FIG. 14, all vector products of v1×v2, v2×v3, v3×v4, and v4×v1 are to have positive sign (i.e., each angle θ is smaller than 180°), and therefore the quadrilateral is determined to be a convex polygon. Note that all vector products can have negative sign, depending on how vectors are defined.

(a) through (d) of FIG. 15 illustrate examples of respective captured images in each of which a subject partially stays in the captured image. Even in a case where the subject partially stays in the captured image as illustrated in (a) through (d) of FIG. 15, it is possible to calculate, by the use of a virtual line segment, a quadrilateral indicative of a part of a contour of the subject. Each of (a), (b), and (c) of FIG. 15 illustrates a case where one of four sides defining a contour of the subject does not stay in the captured image, and (d) of FIG. 15 illustrates a case where two of four sides defining a contour of the subject do not stay in the captured image.

In a case where the candidate quadrilateral calculating section 15 determines that four sides of a candidate quadrilateral can be calculated based on the selected four line segments (YES in step S34), the candidate quadrilateral calculating section 15 controls a memory to store calculated four sides as a candidate quadrilateral (step S35).

On the other hand, in a case where four sides of a candidate quadrilateral cannot be calculated (NO in step S34), the candidate quadrilateral calculating section 15 carries out processes of a step S36 and subsequent step(s).

After the step S35, the candidate quadrilateral calculating section 15 confirms whether or not all combinations of the line segments have been selected (step S36).

In a case where all the combinations of the line segments have been selected (YES in step S36), the candidate quadrilateral calculating section 15 prioritizes candidate quadrilaterals in order of plausibility (step S37).

In general, a user of a digital camera seems to capture an image of a subject such that the subject stays in a captured image as large as possible. In a case of a simple combination of line segments, a line segment(s) other than line segments specifying a contour of the subject in the captured image is (are) likely to be used as part of sides of a candidate quadrilateral. Under the circumstances, candidate quadrilaterals are prioritized in a descending order of evaluation values. The evaluation values are defined by lengths of line segments (contour line segment and virtual line segment) corresponding to respective four sides defining each candidate quadrilateral. Since the virtual line segment is not an original line segment, it is alternatively possible to reduce the evaluation value of the virtual line segment by multiplying, by a predetermined ratio less than 1, a length of the virtual line segment of a side of a quadrilateral. That is, the candidate quadrilateral calculating section 15 employs, as an evaluation value of a candidate quadrilateral, a value which positively correlates with lengths of a contour line segment and a virtual line segment. Moreover, an evaluation value of a unit length of the virtual line segment is set to be smaller than that of a unit length of the contour line segment.

The following description will discuss an example of an evaluation value, with reference to FIGS. 16 and 17. FIG. 16 is an explanatory view for explaining an evaluation value of a candidate quadrilateral. (a) and (b) of FIG. 17 are views illustrating concrete examples of candidate quadrilaterals having respective different evaluation values. In FIG. 17, a quadrilateral indicated by thick dotted line represents a candidate quadrilateral. In FIG. 16, a total length of line segments a, b, c, and d represents an evaluation value. In a case where a side of a candidate quadrilateral is shorter than a line segment (e.g., the line segments b and d of FIG. 16) constituting the side, an evaluation value of the candidate quadrilateral is calculated by using a length by which the line segment and the side overlap each other.

As illustrated in (a) of FIG. 17, the candidate quadrilateral, which corresponds to four sides defining a contour of a subject in a captured image, has long sides. Since line segments of each of the sides are long, the candidate quadrilateral has a high evaluation value. On the other hand, as illustrated in (b) of FIG. 17, in the case of the candidate quadrilateral which has a side derived from a line segment other than a contour of a subject in a captured image (e.g., in a case where a side of the candidate quadrilateral is calculated based on a part of a character written on a whiteboard), the line segment of the side is short. As such, the candidate quadrilateral has a low evaluation value.

According to the present embodiment, the contour line segments specifying the contour of the subject in the captured image are extracted from the captured image, as early described. In practice, however, a line segment, which does not define the contour of the subject, is sometimes extracted as a contour line segment (see (b) of FIG. 17). The above evaluation value causes a reduction in priority of a candidate quadrilateral, which has been calculated based on a line segment which should not have been extracted as a contour line segment.

In a case where combinations of line segments have not all been selected (NO in step S36), the candidate quadrilateral calculating section 15 repeats the step S33 and subsequent steps.

Note that a prioritizing section for prioritizing quadrilaterals can be separately provided from the candidate quadrilateral calculating section 15. The prioritizing section prioritizes a plurality of candidate quadrilaterals, which have been specified by the candidate quadrilateral calculating section 15, based on lengths of a contour line segment and a virtual line segment of each of the plurality of candidate quadrilaterals.

(Importance of Reduction in Evaluation Value of Virtual Line Segment)

The following description will discuss importance of reduction in evaluation value of a virtual line segment, which is contained in a side of a quadrilateral, by multiplying a length of the virtual line segment by a predetermined ratio less than 1. FIG. 18 is an explanatory view for explaining the importance of reduction in evaluation value of a virtual line segment.

A quadrilateral to be detected in FIG. 18 is a quadrilateral defined by four straight lines containing respective line segments s1, s2, s3, and s4. Note that the line segment s2 is shorter than a corresponding side of a subject. An extracted line segment becomes shorter than an actual side, for example, in a case where the subject is slightly bent or in a case where the side of the subject itself is not an accurate straight line because of distortion of a lens.

According to the example illustrated in FIG. 18, in a case where an evaluation value of a quadrilateral is equal to a total of lengths of line segments contained in respective sides of the quadrilateral without any modification, a quadrilateral defined by the line segments s3, s4, and s1 and a virtual line segment 49 has an evaluation value higher than that of the quadrilateral defined by the line segments s1, s2, s3, and s4. This causes a difficulty in prioritizing of an appropriate quadrilateral for correction as a higher order candidate quadrilateral.

By setting an evaluation value per a unit length of a virtual line segment, which is contained in a side of a quadrilateral, to be lower than that per a unit length of a contour line segment, it is possible to raise a possibility that the quadrilateral having the virtual line segment is prioritized as a higher order candidate quadrilateral only in a case where a subject partially stays in a captured image.

(Details of Processes Carried Out by Quadrilateral Selecting Section 16)

FIG. 19 is a view illustrating an example of how the monitor 7 displays a captured image and a candidate quadrilateral. The quadrilateral selecting section 16 controls the monitor 7 to display a captured image 81 and a candidate quadrilateral 82 (see FIG. 19). In a case where the user of the digital camera 100 operates the operating button 6 so as to select one of a plurality of candidate quadrilaterals, the quadrilateral selecting section 16 supplies, as a quadrilateral for correction used to correct the captured image, a selected candidate quadrilateral to the image correcting section 17.

Specifically, the quadrilateral selecting section 16 controls the monitor 7 to first display a candidate quadrilateral which has a highest evaluation value. FIG. 20 illustrates an example of the operating button 6. Every time a next candidate displaying button 61 is pressed, another candidate quadrilateral is displayed in a descending order of evaluation values. In contrast, every time a previous candidate displaying button 62 is pressed, another candidate quadrilateral is displayed in an ascending order of the evaluation values. A determining button 63 is pressed to correct the captured image by the use of a candidate quadrilateral which is being displayed on the monitor 7. That is, the determining button 63 is pressed to specify, as a quadrilateral for correction, a candidate quadrilateral which is being displayed at that time. This causes information for specifying quadrilateral for correction to be entered.

(Details of Processes Carried Out by Image Correcting Section 17)

The image correcting section 17 (i) calculates an aspect ratio of a subject in accordance with the principle of perspective transformation (described below) and (ii) corrects a distorted quadrilateral in a captured image so that the distorted quadrilateral is changed into a rectangle.

(How to Calculate Aspect Ratio of Subject)

The following description will discuss how to calculate an aspect ratio of a subject. FIG. 21 is a view illustrating a positional relation between objects in a perspective transformation. A positional relation between objects in a perspective transformation is indicated by a three-dimensional vector space whose origin O is a center of a lens. An image capturing surface 51 is perpendicular to an optical axis 52 of the optical system 1, and a distance between the center of the lens and the image capturing surface 51 is defined as a focal length d. In a case of the digital camera 100, the image capturing surface 51 corresponds to the image capturing surface of the image sensor 2. According to a physical positional relation, the image capturing surface 51 is located so as to be opposite to a subject 53 with respect to the center of the lens. According to the perspective transformation, however, a positional relation such as that illustrated in FIG. 21 is generally used in view of easiness of understanding.

It is assumed that (i) the subject 53, which is a rectangle, has apexes $q_1$, $q_2$, $q_3$, and $q_4$ and (ii) a distorted quadrilateral 51a, which is formed on the image capturing surface 51, has apexes $p_1$, $p_2$, $p_3$, and $p_4$. Since the image capturing surface 51 is perpendicular to the optical axis 52, $p_i$ ($1 \leq i \leq 4$) is defined by Formula (4) as follows:

[Mathematical Expression 1]

$$p_i = \begin{pmatrix} a_i \\ b_i \\ d \end{pmatrix} \quad (4)$$

Note that $q_i$ is obtained by multiplying $p_i$ by a constant, and therefore $q_i$ ($1 \leq i \leq 4$) is expressed by Formula (5) as follows:

$$q_i = t_i p_i \quad (5)$$

Since the subject 53 is a rectangle, the following Formulae (6a) and (6b) can be made.

$$q_1 - q_2 = q_3 - q_4 \quad (6a)$$

$$(q_1 - q_2) \cdot (q_1 - q_3) = 0 \quad (6b)$$

In Formula (6b), "·" indicates an inner product of vectors. Formula (6a) indicates a requirement in which the quadrilateral is a parallelogram, and the Formula (6b) indicates a requirement in which adjacent sides are perpendicular to each other.

From the Formulae (5) and (6a), Formula (7) below can be obtained.

[Mathematical Expression 2]

$$\begin{pmatrix} a_1 t_1 - a_2 t_2 - a_3 t_3 + a_4 t_4 \\ b_1 t_1 - b_2 t_2 - b_3 t_3 + b_4 t_4 \\ d t_1 - d t_2 - d t_3 + d t_4 \end{pmatrix} = 0 \quad (7)$$

Since the focal length d is not zero, Formula (8) below can be obtained from a third row in a matrix of the Formula (7).

[Mathematical Expression 3]

$$d t_1 - d t_2 - d t_3 + d t_4 = 0 \Leftrightarrow d(t_1 - t_2 - t_3 + t_4) = 0 \Leftrightarrow t_4 = t_2 + t_3 - t_1 \quad (8)$$

Formula (9) below can be derived from Formulae (5) and (6a), and Formula (10) below can be obtained by transforming the Formula (9) by the use of the Formula (8).

$$t_1 p_1 - t_2 p_2 = t_3 p_3 - t_4 p_4 \quad (9)$$

[Mathematical Expression 4]

$$t_1(p_1 - p_4) = \\ t_2(p_2 - p_4) + t_3(p_3 - p_4) \Leftrightarrow (p_1 - p_4) = \frac{t_2}{t_1}(p_2 - p_4) + \frac{t_3}{t_1}(p_3 - p_4) \quad (10)$$

Here, an equation expressed by Formula (12) below can be obtained by changing variables of the Formula (10) in accordance with Formula (11) below.

[Mathematical Expression 5]

$$k_1 = \frac{t_2}{t_1}$$
$$k_2 = \frac{t_3}{t_1} \quad (11)$$

[Mathematical Expression 6]

$$(p_1 - p_4) = k_1(p_2 - p_4) + k_2(p_3 - p_4) \Leftrightarrow \begin{pmatrix} a_1 - a_4 \\ b_1 - b_4 \\ 0 \end{pmatrix} = k_1 \begin{pmatrix} a_2 - a_4 \\ b_2 - b_4 \\ 0 \end{pmatrix} + k_2 \begin{pmatrix} a_3 - a_4 \\ b_3 - b_4 \\ 0 \end{pmatrix} \quad (12)$$

Formula (12) is simultaneous equations with regard to $k_1$ and $k_2$, and Formula (13) below can be obtained by solving Formula (12).

[Mathematical Expression 7]

$$k_1 = \frac{a_1(b_4 - b_3) + a_3(b_1 - b_4) + a_4(b_3 - b_1)}{a_2(b_4 - b_3) + a_3(b_2 - b_4) + a_4(b_3 - b_2)}$$
$$k_2 = -\frac{a_1(b_4 - b_2) + a_2(b_1 - b_4) + a_4(b_2 - b_1)}{a_2(b_4 - b_3) + a_3(b_2 - b_4) + a_4(b_3 - b_2)} \quad (13)$$

Formula (14) below can be obtained by further transforming Formula (6b), and a focal length can be calculated by solving Formula (14) for the focal length d.

[Mathematical Expression 8]

$$(q_1 - q_2) \cdot (q_1 - q_3) = 0 \Leftrightarrow$$
$$t_1^2 p_1 \cdot p_1 - t_1 t_3 p_1 \cdot p_3 - t_2 t_1 p_2 \cdot p_1 + t_2 t_3 p_2 \cdot p_3 = 0 \Leftrightarrow$$
$$p_1 \cdot p_1 - k_2 p_1 \cdot p_3 - k_1 p_2 \cdot p_1 + k_1 k_2 p_2 \cdot p_3 = 0 \quad (14)$$

In a case where the quadrilateral corresponding to the subject 53 is distorted and has a trapezoid shape on the image capturing surface 51, a denominator in Formula (15) below becomes zero. This allows the focal length d not to be calculated.

[Mathematical Expression 9]

$$d = \sqrt{\frac{-a_1^2 - b_1^2 + k_2(a_1 a_3 + b_1 b_3) + k_1(a_1 a_2 + b_1 b_2) - k_1 k_2(a_2 a_3 + b_2 b_3)}{(k_1 - 1)(k_2 - 1)}} \quad (15)$$

In such a case, a focal length can be provided from outside. That is, it is possible to use a focal length which is indicated by focal length information which has been supplied from the CPU 5 to the focal length input section 11.

An aspect ratio of the subject 53 is expressed by Formula (16) below, with the use of the focal length d.

[Mathematical Expression 10]

$$\frac{H}{W} = \frac{|q_1 - q_3|}{|q_1 - q_2|} = \frac{|t_1 p_1 - t_3 p_3|}{|t_1 p_1 - t_2 p_2|} = \frac{|t_1||p_1 - k_2 p_3|}{|t_1||p_1 - k_1 p_2|} \\ = \sqrt{\frac{(a_1 - k_2 a_3)^2 + (b_1 - k_2 b_3)^2 + (d - k_2 d)^2}{(a_1 - k_1 a_2)^2 + (b_1 - k_1 b_2)^2 + (d - k_1 d)^2}} \quad (16)$$

(How to Correct Image)

The following description will discuss how to correct a distorted quadrilateral to a rectangle.

In order to correct a distortion, first, a length magnification $t_i$ ($1 \le i \le 4$). A distance between the origin O and the respective apexes of the subject 53 is obtained, by multiplying, by a corresponding one of the length magnifications $t_1$ through $t_4$, a corresponding distance between the origin O and the respective apexes of the image capturing surface 51. According to the perspective transformation, although actual length magnifications can not be calculated, it is possible to freely determine a location of the subject 53 so that a length magnification ratio $t_1:t_2:t_3:t_4$ is maintained. Under the circumstances, in a case where $t_1 = 1$, the length magnification $t_i$ ($1 \le i \le 4$) can be set as expressed by Formula (17) below.

$$t_1 = 1$$
$$t_2 = k_1$$
$$t_3 = k_2$$
$$t_4 = k_1 + k_2 - 1 \quad (17)$$

A rectangle, which has an appropriate size that matches an aspect ratio obtained based on Formula (16), is prepared as a corrected image. (a) and (b) of FIG. 22 illustrate a correspondence between a corrected pixel value and a corresponding pixel of a distorted quadrilateral which has not been corrected. (a) of FIG. 22 is a view illustrating an example of a corrected image, and (b) of FIG. 22 is a view illustrating an example of a quadrilateral contained in an image which has not been corrected.

A first pixel value in a rectangle 54, which corresponds to a corrected image, is located at an intersection of a first line segment and a second line segment. A second pixel value in a quadrilateral 55 for correction, which is contained in an image which has not been corrected, is located at an intersection of a third line segment and a fourth line segment. The first pixel value corresponds to the second pixel value. The first line segment is obtained by (i) carrying out internal divisions, at a first ratio of [m:(1−m)], with respect to upper and lower sides of the rectangle 54 and (ii) connecting internally dividing points of the respective upper and lower sides of the rectangle 54. The second line segment is obtained by (i) carrying out internal divisions, at a second ratio of [n:(1−n)], with respect to left and right sides of the rectangle 54 and (ii) connecting internally dividing points of the respective left and right sides of the rectangle 54. The third line segment is obtained by (i) carrying out internal divisions, at a third ratio of [$t_2 \times m : t_1 \times (1-m)$], with respect to an upper side of the quadrilateral 55 for correction, (ii) carrying out internal divisions, at a fourth ratio of [$t_4 \times m : t_3 \times (1-m)$], with respect to a lower side of the quadrilateral 55 for correction, and (iii) connecting internally dividing points of the respective upper and lower sides of the quadrilateral 55 for correction. The fourth line segment is obtained by (i) carrying out internal divisions, at a fifth ratio of $[t_3 \times n : t_1 \times (1-n)]$, with respect to a left side of the quadrilateral 55 for correction, (ii) carrying out internal divisions, at a sixth ratio of $[t_4 \times n : t_2 \times (1-n)]$, with respect to a right side of the quadrilateral 55 for correction, and (iii) connecting internally dividing points of the respective left and right sides of the quadrilateral 55 for correction.

A size of an object on an image capturing surface is inversely proportional to a length magnification. In view of the circumstances, each of the first through sixth interior division ratios of a quadrilateral contained in an image which has not been corrected is multiplied by an inverse ratio of a corresponding length magnification. In accordance with the correspondence, a corrected image is calculated by use of an interpolation such as a bilinear interpolation or a bicubic interpolation. According to the bilinear interpolation, a pixel value of a corrected image is a weighted average of pixel values of respective four pixels around a location which is calculated in accordance with interior division ratios of a quadrilateral contained in an image which has not been corrected. According to the bicubic interpolation, a pixel value of a corrected image is a weighted average of pixel values of respective 16 pixels around a location which is calculated in accordance with interior division ratios of a quadrilateral contained in an image which has not been corrected.

(Flow of Processes Carried Out by Image Correcting Section 17)

FIG. 23 is a flowchart illustrating an example flow of how the image correcting section 17 processes. The image correcting section 17 confirms whether or not a focal length can be calculated, in accordance with the principle of the perspective transformation, based on a quadrilateral for correction which has been first selected by the user (step S41).

In a case where a focal length can be calculated (YES in step S41), the image correcting section 17 calculates an aspect ratio of a corrected image with the use of the focal length thus calculated (step S42).

On the other hand, in a case where a focal length cannot be calculated (NO in step S41), the image correcting section 17 calculates an aspect ratio of a corrected image with the use of a focal length entered via the focal length input section 11 (step S43).

Subsequently, the image correcting section 17 prepares a corrected image, in accordance with the principle of the perspective transformation, with the use of the aspect ratio of the corrected image and the length magnification (step S44).

Note that the contour extracting section 13, the line segment extracting section 14, the candidate quadrilateral calculating section 15, and the quadrilateral selecting section 16 carry out the above processes with respect to an image obtained by reducing the captured image. This allows a reduction in process cost.

Embodiment 2

The following description will discuss Embodiment 2 of the present invention, with reference to FIGS. 24 through 26. Note that the same reference numerals are given to constituents which are similar to those in Embodiment 1, and descriptions of such constituents are omitted here. Embodiment 2 will discuss an example where a candidate quadrilateral is shaped by a candidate quadrilateral calculating section 15. Specifically, the candidate quadrilateral calculating section 15 changes a location (skew) of a side, containing a virtual line segment, of a candidate quadrilateral which has been identified by the candidate quadrilateral calculating section 15 such that such a side and its opposite side are located in parallel with each other. As such, the candidate quadrilateral calculating section 15 of Embodiment 2 serves also as a quadrilateral shaping section. An image correcting section 17 corrects a distortion generated caused by perspective transformation of a captured image, based on the candidate quadrilateral shaped by the candidate quadrilateral calculating section 15.

FIG. 24 is a flowchart illustrating an example flow of how the candidate quadrilateral calculating section 15 of an image processing device 10 in accordance with Embodiment 2 processes. In addition to the processes of the candidate quadrilateral calculating section 15 of Embodiment 1, the candidate quadrilateral calculating section 15 of Embodiment 2 carries out a side correction process (step S55) between the steps S34 and S35 illustrated in FIG. 12. Steps S51 through S54 illustrated in FIG. 24 are identical with the steps S31 through S34, respectively. Steps S56 through S58 illustrated in FIG. 24 are identical with the steps S35 through S37, respectively.

In the side correction process of the step S55, the image correcting section 17 corrects a side, containing a virtual line segment, of a candidate quadrilateral such that the side and its opposite side are located in parallel with each other. With the configuration, it is possible to obtain a quadrilateral necessary for correcting a captured image, even in a state where an image has been captured by a digital camera which is being rotated with respect to a subject (see FIG. 25). (a) of FIG. 25 is a view illustrating a candidate quadrilateral in which a location of a side of the candidate quadrilateral has not been corrected. (b) of FIG. 25 is a view illustrating a candidate quadrilateral in which a location of a side of the candidate quadrilateral has been corrected. In each of (a) and (b) of FIG. 25, the candidate quadrilateral is indicated by thick dotted lines.

(Flow of Side Correction Process)

FIG. 26 is a flowchart illustrating an example flow of the side correction process. In the side correction process, the candidate quadrilateral calculating section 15 first confirms whether or not the number of a virtual line segment(s) contained in four sides of a quadrilateral is one (step S61).

In a case where the number of the virtual line segment(s) is one (YES in step S61), the candidate quadrilateral calculating section 15 changes a location of one of two apexes, which are both ends of a side containing the virtual line segment, such that the side containing the virtual line segment and its opposite side are located in parallel with each other (step S62).

Note that it is possible to change a location of any one of the two apexes which are both ends of the side containing the virtual line segment. It is, however, preferable to change a location of one of the two apexes, whichever causes the quadrilateral to be larger in size. This is because a larger area of a subject can be contained in the corrected image. In this case, the apex whose location has been changed sometimes does not stay in a line segment image (see (b) of FIG. 25). In such a case, locations of respective four apexes of a candidate quadrilateral can be identified by use of coordinates (a location of pixel) of a formed image (virtual image) which (i) has a coordinate system identical with that of the line segment image and (ii) is larger in size than the line segment image.

Subsequently, the candidate quadrilateral calculating section 15 calculates four sides of a quadrilateral having the apex whose location has been changed (step S63).

On the other hand, in a case where the number of the virtual line segments is not one (NO in step S61), the candidate quadrilateral calculating section 15 ends the process instead of further proceeding. Here, the number of the virtual line segment(s) can be zero, one, or two, in accordance with early described Requirements 4 and 5 for selecting a candidate quadrilateral in the step S53 (see FIG. 23) of the candidate quadrilateral calculating process. In a case where the number of the virtual line segments is two, such two virtual line segments are already located so as to face and be in parallel with each other. In a case where the number of the virtual line segment is zero, it means that all the line segments of the candidate quadrilateral are original line segments. In such cases, it is not necessary to change an apex of the candidate quadrilateral.

Note that a quadrilateral shaping section can be provided separately from the candidate quadrilateral calculating section 15 so as to carry out the above-described shaping with respect to each of candidate quadrilaterals calculated by the candidate quadrilateral calculating section 15. In this case, the image correcting section 17 corrects a distortion in perspective transformation of a captured image based on a quadrilateral shaped by the quadrilateral shaping section.

Embodiment 3

The following description will discuss Embodiment 3 of the present invention, with reference to FIGS. 27 through 29. Note that the same reference numerals are given to constituent members which are identical to those in Embodiments 1 and 2, and descriptions of such constituent members are omitted here.

According to Embodiment 3, insert location information, which is indicative of where a virtual line segment is to be put, is entered by a user of a digital camera 100. A candidate quadrilateral calculating section 15 puts a virtual line segment in a location indicated by the insert location information.

The insert location information is entered via an operating button 6 or a soft key displayed on a monitor 7. As such, each of the operating button 6 and the monitor 7 serves as an insert location information obtaining section for obtaining insert location information.

FIG. 27 is a flowchart illustrating an example flow of how the candidate quadrilateral calculating section 15 in an image processing device 10 of Embodiment 3 carries out a candidate quadrilateral calculating process. In the candidate quadrilateral calculating process of Embodiment 3, a selection process (step S71) is carried out in which the user selects a virtual line segment before the step S31 illustrated in FIG. 12, in addition to the candidate quadrilateral calculating process of Embodiment 1. Note that steps S72 through S78 illustrated in FIG. 27 are identical with the steps S31 through S37, respectively.

(a) of FIG. 28 is a view illustrating an example screen, displayed on the monitor 7, which is used when a virtual line segment is selected. (b) of FIG. 28 is a view illustrating a screen which is displayed on the monitor 7 when a rightmost virtual line segment is selected. When a virtual line segment is inserted (step S71), only a virtual line segment, which has been selected by the user, is put in. During the selection of the virtual line segment, the candidate quadrilateral calculating section 15 controls the monitor 7 to display (i) a captured image 75 and (ii) cursors 71 through 74, in the vicinity of respective upper, right, lower, and left outer circumference parts of the captured image 75 (see (a) of FIG. 28). Each of the cursors through 74 indicates a location in which a corresponding virtual line segment is put.

The user of the digital camera 100 determines a location, in which a virtual line segment is to be put, via the operating button 6. In a case where the user has selected the rightmost virtual line segment, the cursor 72, corresponding to the rightmost virtual line segment, is changed in color (see (b) of FIG. 28).

FIG. 29 illustrates an example operating button 6 via which a location, where a virtual line segment is to be put, is entered. When a right line segment selecting button 601 is pressed, a rightmost virtual line segment is selected. When the right line segment selecting button 601 is pressed again, the selection of the rightmost virtual line segment is released. Similarly, a left line segment selecting button 602, an upper line segment selecting button 603, and a lower line segment selecting button 604 are provided in the operating button 6. When a determining button 605 is pressed, the selection is completed.

Note that the operating button 6 illustrated in FIG. 29 and the operating button 6 illustrated in FIG. 20 can be realized by a single component. For example, the right line segment selecting button 601 and the next candidate displaying button 61 can be realized by a single component, the left line segment selecting button 602 and the previous candidate displaying button 62 can be realized by a single component, and the determining button 605 and the determining button 63 can be realized by a single component.

The operating button 6 is not necessarily realized by a physical button. For example, it is therefore possible to provide a touch panel, on the monitor 7, for detecting a touched location so as to detect a graphic symbol, such as the cursors 71 through 74 displayed on the monitor 7, having been touched. In such an example, when the graphic symbol having been touched is detected, the same processes are carried out as those carried out when the button having been touched is detected.

Embodiment 4

The following description will discuss Embodiment 4 of the present invention, with reference to FIGS. 30 through 32. Note that the same reference numerals are given to constituent members which are identical to those in Embodiments 1 through 3, and descriptions of such constituent members are omitted here.

(Configuration of Image Processing Device 20)

FIG. 30 is a block diagram illustrating a configuration of an image processing device 20 of Embodiment 4. The image processing device 20 is different from the image processing device 10 in that the image processing device 20 includes an insert location determining section 19 for determining a location where a virtual line segment is to be put (see FIG. 30).

The insert location determining section 19 determines that a subject in a captured image is interrupted at an outer circumference side of the captured image. Specifically, the insert location determining section 19 determines where a virtual line segment is to be put by determining which one of four sides defining respective four outer circumference sides of a captured image intersects with a subject in the captured image. That is, the insert location determining section 19 determines that a virtual line segment should be put in a location where an outer circumference side is in contact with the subject in the captured image.

For example, as illustrated in (a) of FIG. 4, in a case where a right side part of the subject in the captured image is in contact with a rightmost side of the captured image, the insert location determining section 19 determines that a virtual line segment should be put in a location where the rightmost part of the captured image is located.

The candidate quadrilateral calculating section 15 inserts a virtual line segment so as to make up for an interrupted part determined by the insert location determining section 19.

Specifically, the candidate quadrilateral calculating section 15 inserts the virtual line segment (i) in the vicinity of the side determined by the insert location determining section 19 or (ii) such that the virtual line segment and the side overlap each other. The candidate quadrilateral calculating section 15 further carries out subsequent processes identical with those described in Embodiment 1.

(Details of How Insert Location Determining Section 19 Processes)

The following description will discuss, in detail, how an insert location determining process will be carried out by the insert location determining section 19. FIG. 31 is a flowchart illustrating an example flow of how the insert location determining section 19 processes. Each of (a) and (b) of FIG. 32 is an explanatory view for explaining how an insert location determining process is carried out by the insert location determining section 19.

The insert location determining section 19 first binarizes a captured image (step S81). The captured image is binarized by, for example, Ohtsu's method. According to the Ohtsu's method, (i) a histogram of luminance components of the captured image is prepared and (ii) in a case where the histogram is divided into two areas based on a threshold, the threshold is selected so as to cause a maximum dispersion between the two areas. Such binarization causes pixels in the captured image to be classified into a white pixel and a black pixel.

Next, the insert location determining section 19 carries out an expansion process and a contraction process with respect to a binarized image more than once so as to remove a noise (step S82). In the expansion process, a black pixel adjacent to a white pixel is converted into a white pixel so that a small black pixel area can be integrated into a white pixel area. In the contraction process, a white pixel adjacent to a black pixel is converted into a black pixel so that a small white pixel area can be integrated into a black pixel area. Note that a process is called "closing" in which an expansion process is carried out more than once and then a contraction process is carried out as many number of times. A process is called "opening" in which a contraction process is carried out more than once and then of an expansion process is carried out as many number of times. A noise can be removed by sequentially carrying out the closing and the opening.

Each of (a) and (b) of FIG. 32 is an explanatory view for explaining how an insert location determining process is carried out by the insert location determining section 19. The insert location determining section 19 carries out a labeling process with respect to a binarized image from which a noise has been removed (step S83) (see (a) of FIG. 32). In this labeling process, each white pixel area and/or each black pixel area is labeled with a corresponding numeral.

After that, the insert location determining section 19 integrates a labeled area, which has an area smaller than a predetermined threshold, into a surrounding area (step S84) (see (b) of FIG. 32).

On the premise that a center part of a captured image belongs to a subject in the captured image, the insert location determining section 19 determines which one of sides, defining an outer circumference of the captured image, is in contact with an area containing a center pixel (step S85). Then, the insert location determining section 19 supplies, to the candidate quadrilateral calculating section 15, a determined result, i.e., information indicating that a virtual line segment should be put in a location of the one of sides which is in contact with the subject in the captured image.

Note that, by taking into consideration a noise, it is also possible to determine, in the step S85, that an area of the subject is an area containing a plurality of pixels labeled with identical numerals which numerals are the largest in number among the pixels in the vicinity of a center of the captured image.

In a case where the insert location determining section 19 determines, in the step S85, that the subject in the captured image is not in contact with any of the sides of the captured image, the insert location determining section 19 can supply, to the candidate quadrilateral calculating section 15, information indicating that there is no necessity to insert a virtual line segment. In this case, the candidate quadrilateral calculating section 15 calculates a candidate quadrilateral without inserting a virtual line segment.

Embodiment 5

The following description will discuss Embodiment 5 of the present invention, with reference to FIG. 33.

(1. Configuration of Computer)

FIG. 33 is a view illustrating a configuration of a computer 200 in accordance with Embodiment 5.

The computer 200 includes (i) a keyboard 201 and a mouse 202 each of which is an input device, (ii) a CPU (Central Processing Unit) 204, (iii) a memory 206 including a ROM (Read Only Memory) and a RAM (Random Access Memory), (iv) a hard disk (storage section) 207, and (v) an output interface 203. The computer 200 supplies a display image to a monitor 205 via the output interface 203.

The computer 200 further includes (i) an optical disk drive 209 which can read data from an optical disk such as a CD-ROM (Compact Disk Read-Only Memory) 212, (ii) an FD drive 208 which can read data from a flexible disk (FD) 211, and (iii) a communication module 210 which can send data to and receive data from an external device.

An image processing program, which causes the CPU 204 to carry out each of the early described processes in the image processing device 10 or the image processing device 20, is distributed while being stored in a storage medium such as the CD-ROM 212 or the flexible disk 211. The image processing program is read out by a device such as the optical disk drive 209 or the FD drive 208, and is then installed in the hard disk 207.

Note that a storage section for storing the image processing program in the computer 200 is not limited to the hard disk 207, and therefore can be a flash memory (semiconductor memory) such as an SSD (Solid State Drive).

Alternatively, in a case where the computer 200 is connected with a network via the communication module 210, the computer 200 can receive an image processing program which has been sent from a server on the network, and then install the image processing program in the hard disk 207.

Note that, in the case where the image processing program is received via the network, the image processing program can be loaded into the RAM and then executed on the RAM, instead of being installed in the hard disk 207.

The storage medium in which the image processing program is stored is not limited to the CD-ROM 212 or the flexible disk 211, and therefore can be, for example, a DVD (Digital Versatile Disk)-ROM or a memory card. In such a case, the computer 200 further includes a driver for reading such a storage medium.

The CPU 204 reads out the image processing program installed in the hard disk 207 and executes the image processing program, so as to serve as each of the focal length input section 11, the image inputting section 12, the contour extracting section 13, the line segment extracting section 14, the candidate quadrilateral calculating section 15, the quadrilateral selecting section 16, the image correcting section 17, the image outputting section 18, and the insert location determining section 19.

Specifically, the CPU 204 (i) reads out a captured image, which has been captured by a digital camera, from the hard disk 207, the CD-ROM 212, or the flexible disk 211 and then (ii) controls (a) the memory 206 to store the captured image and (b) the monitor 205 to display the captured image. The CPU 204 generates a corrected image having no distortion. Then, the CPU 204 controls (i) the memory 206 to store the corrected image and (ii) the monitor 205 to display the corrected image via the output interface 203.

(2. Flow of Processes Carried Out by Computer)

The computer 200 of Embodiment 5 carries out processes which are substantially identical with those (see FIG. 5) carried out by the image processing device 10 of Embodiment 1. The following description will discuss, in detail, each process but merely discuss a point different from that of Embodiment 1.

The focal length input section 11 controls the memory 206 to store a focal length which is obtained when a captured image, which is to be corrected, has been captured. The focal length can be read out from Exif contained in data of the captured image. Alternatively, it is possible to employ a configuration in which a focal length, calculated when a captured image has been corrected before, (i) is stored in the hard disk 207 such that the focal length and the captured image are associated with each other and then (ii) is read out from the hard disk so as to be stored in the memory 206.

Descriptions of the image inputting section 12, the contour extracting section 13, the line segment extracting section 14, and the candidate quadrilateral calculating section 15 of Embodiment 5 are omitted. This is because the sections 12 through 15 are similar to those of Embodiment 1.

The quadrilateral selecting section 16 controls, via the output interface 203, the monitor 205 to display the captured image and each of candidate quadrilaterals. A user of the computer 200 selects a quadrilateral from the candidate quadrilaterals with the use of the keyboard 201 and the mouse 202, instead of the operating button 6. In this case, for example, figures of operation buttons such as those illustrated in FIG. 20 are displayed on the monitor 205, and each process is carried out when the user clicks on, with the mouse 202 button, a corresponding operation button on the monitor 205.

The image correcting section 17 of Embodiment 5 carries out a process similar to that of Embodiment 1, and therefore a description of the image correcting section 17 is omitted here.

The image outputting section 18 controls (i) the memory 206 to store a corrected image and (ii) the monitor 205 to display the corrected image.

Note that the processes carried out by the computer 200 (see FIG. 33) can be partially carried out by another computer which is connected with the computer 200 via a communication module. In such a case, for example, the computer 200 transmits a captured image to the another computer and subsequently receives candidate quadrilaterals which have been calculated by the another computer. Then, the computer 200 controls the monitor 205 to display each of the candidate quadrilaterals. The computer 200 sends a quadrilateral, which has been selected by the user, to the another computer and subsequently receives a corrected image which has been generated by the another computer. Then, the computer 200 controls the monitor 205 to display the corrected image.

Alternatively, the computer 200 sends a captured image to another computer and subsequently receives a corrected image generated by the another computer with the use of a candidate quadrilateral having a highest evaluation value. Then, the computer 200 controls the monitor 205 to display the corrected image.

As above described, in the image processing device of the present invention, it is preferable that the quadrilateral identifying section puts the at least one virtual line segment in the line segment image such that (i) the at least one virtual line segment extends along respective at least one of four sides which define an outer circumference of the line segment image or (ii) the at least one virtual line segment and the respective at least one of four sides overlap each other.

With the configuration, an interrupted part of the subject in the captured image can be made up for efficiently. Note that the at least one virtual line segment can have a predetermined length, which is not limited in particular.

It is preferable that the at least one virtual line segment is four virtual line segments; and the quadrilateral identifying section puts the four virtual line segments in respective four sides which define an outer circumference of the line segment image.

With the configuration, it is possible to certainly make up for the interrupted part, even in a case where information is not available which indicates where the subject in the captured image is interrupted.

It is preferable that the image processing device further includes an insert location information obtaining section for accepting insert location information from a user, the insert location information being indicative of a location(s) where the at least one virtual line segment is to be put, the quadrilateral identifying section putting the at least one virtual line segment in the location indicated by the insert location information.

According to the configuration, the insert location information obtaining section accepts, from the user, the insert location information indicative of the location where the at least one virtual line segment is to be put, and the quadrilateral identifying section puts the at least one virtual line segment in the location indicated by the insert location information.

With the configuration, it is possible (i) to surely make up for an interrupted part of the subject in the captured image and (ii) to avoid putting of an unnecessary virtual line segment. This allows a reduction in process amount for identifying a quadrilateral.

It is preferable that the image processing device further includes a determining section for determining that the subject in the captured image is interrupted at an outer circumference side of the captured image, the quadrilateral identifying section putting the at least one virtual line segment in the line segment image so as to make up for an interrupted part determined by the determining section.

According to the configuration, the determining section determines the interrupted part at the outer circumference side of the captured image, and the at least one virtual line segment is put so as to make up for the interrupted part.

With the configuration, it is possible to determine a location of the interrupted part of the captured image without obtaining, from the user, information indicative of an interrupted part of the captured image. Moreover, a virtual line segment can be put in an appropriate location by putting the virtual line segment in the interrupted part.

It is preferable that the image processing device further includes a determining section for determining which one of four sides, which define an outer circumference of the captured image, is in contact with the subject in the captured image, the quadrilateral identifying section putting the at least one virtual line segment in the line segment image such that (i) the at least one virtual line segment extends along respective at least one of four sides determined by the determining section or (ii) the at least one virtual line segment and the respective at least one of four sides overlap each other.

According to the configuration, the determining section determines which one of four sides (outer circumference sides), which define the outer circumference of the captured image, is in contact with the subject in the captured image. With the process, it is possible to determine an outer circumference side of the captured image which interrupts the subject. This is because the subject is more likely to be interrupted at a part of the subject which part is in contact with the outer circumference side.

With the configuration, it is possible to determine a location of the interrupted part of the captured image without obtaining, from the user, information indicative of an interrupted part of the captured image. Moreover, a virtual line segment can be put in an appropriate location.

It is preferable that the image processing device further includes a quadrilateral shaping section for changing a location of each of at least one side, which contains the respective at least one virtual line segment, of a quadrilateral identified by the quadrilateral identifying section, the location of each of the at least one side being changed such that each of the at least one side and its opposite side are located in parallel with each other, the image correcting section correcting the distortion in perspective transformation of the captured image based on the quadrilateral which has been shaped by the quadrilateral shaping section.

According to the configuration, the quadrilateral shaping section changes the location of each of at least one side, containing the respective at least one virtual line segment, of the quadrilateral identified by the quadrilateral identifying section, such that each of the at least one side (in other words, a side formed by the at least one virtual line segment) and its opposite side are located in parallel with each other. Then, the image correcting section corrects the distortion in perspective transformation of the captured image based on the quadrilateral shaped by the quadrilateral shaping section.

With the configuration, it is possible to obtain an appropriate quadrilateral used to correct an image, even in a case where the subject in the captured image is being rotated with respect to an outer circumference of the captured image.

It is preferable that the image processing device further includes a prioritizing section for prioritizing, in a case where the quadrilateral identifying section identifies a plurality of candidate quadrilaterals, identified plurality of quadrilaterals on the basis of lengths of the contour line segments and the at least one virtual line segment, which are contained in each of the plurality of quadrilaterals.

According to the configuration, in a case where the quadrilateral identifying section identifies a plurality of candidate quadrilaterals, the prioritizing section prioritizes the plurality of candidate quadrilaterals. The prioritization is carried out on the bases of the lengths of the contour line segments and the at least one virtual line segment, which are contained in each of the plurality of quadrilaterals. The plurality of quadrilaterals are prioritized, for example, in descending order of a total length of line segments contained in each of the plurality of quadrilaterals.

With the configuration, even in a case where a plurality of quadrilaterals are identified by the quadrilateral identifying section, it is possible to prioritize the plurality of quadrilaterals in an appropriate order as quadrilaterals for correction, any of which is to be used to correct the captured image. After the prioritization, a quadrilateral having the highest priority can be used as the quadrilateral for correction. Alternatively, the plurality of quadrilaterals can be shown to the user in the prioritized order.

It is preferable that the quadrilateral identifying section employs, as an evaluation value of a candidate quadrilateral, a value which positively correlates with lengths of the contour line segments and the at least one virtual line segment; and an evaluation value of a unit length of the at least one virtual line segment is set to be smaller than that of a unit length of each of the contour line segments.

According to the configuration, the evaluation value of the quadrilateral, which evaluation value is used by the quadrilateral identifying section, positively correlates with lengths of the contour line segments and the at least one virtual line segment. That is, as the lengths of line segments become longer, the evaluation value of the quadrilateral containing the line segments become higher. Moreover, the evaluation value of the unit length of the at least one virtual line segment is set to be smaller than that of the unit length of each of the contour line segments.

A contour line segment extracted from a contour of the subject sometimes becomes short due to fragmentation of contour line segment caused because the subject is partially distorted or a contrast of the subject is low. On the other hand, a virtual line segment has a predetermined length. In a case where the predetermined length is long, the virtual line segment can statistically become longer than the contour line segment.

By setting the evaluation value of the unit length of the virtual line segment to be smaller than that of the unit length of the contour line segment, it is possible to reduce an evaluation value of an identified quadrilateral, which contains an unnecessary virtual line segment.

The technical scope of the present invention encompasses (i) an image processing program for causing a computer to carry out each of the steps of the image processing method and (ii) a computer-readable storage medium in which the image processing program is stored.

Other Modifications

The present invention is not limited to the embodiments, but can be altered by a skilled person in the art within the scope of the claims. An embodiment derived from a proper combination of technical means disclosed in respective different embodiments is also encompassed in the technical scope of the present invention.

Each block of the digital camera 100 above described, in particular, each block of the image processing devices 10 and 20 can be configured by hardware logic or realized by software with the use of CPU as follows.

That is, each of the image processing devices 10 and 20 includes a CPU (central processing unit), a ROM (read only memory), a RAM (random access memory), and a storage device (storage medium) such as a memory. The CPU executes instructions of control programs for realizing the functions of the image processing devices 10 and 20. In the ROM, the programs are stored. Into the RAM the programs are loaded. In the storage device, the programs and various data are stored. The objective of the present invention can also be achieved, by (i) supplying a storage medium, in which program codes (executable programs, intermediate code programs, source programs) of programs for controlling the image processing device 10 of 20 configured by software for realizing the functions, are stored so that a computer can read them, to each of the image processing devices 10 and 20, and then (ii) causing the computer (or CPU or MPU) to read and execute the program codes stored in the storage medium.

The storage medium can be, for example, a tape, such as a magnetic tape or a cassette tape; a disk including (i) a magnetic disk such as a floppy (Registered Trademark) disk or a hard disk and (ii) an optical disk such as CD-ROM, MO, MD, DVD, or CD-R; a card such as an IC card (memory card) or an optical card; or a semiconductor memory such as a mask ROM, EPROM, EEPROM, or flash ROM.

Alternatively, each of the image processing devices 10 and 20 can be arranged to be connected to a communications network so that the program codes are delivered over the communications network. The communications network is not limited to a specific one, and therefore can be, for example, the Internet, an intranet, extranet, LAN, ISDN, VAN, CATV communications network, virtual private network, telephone line network, mobile communications network, or satellite communications network. The transfer medium which constitutes the communications network is not limited to a specific one, and therefore can be, for example, wired line such as IEEE 1394, USB, electric power line, cable TV line, telephone line, or ADSL line; or wireless such as infrared radiation (IrDA, remote control), Bluetooth (Registered Trademark), 802.11 wireless, HDR (high data rate), mobile telephone network, satellite line, or terrestrial digital network. Note that, the present invention can be realized by a computer data signal (i) which is realized by electronic transmission of the program code and (ii) which is embedded in a carrier wave.

Note that the present invention can be also expressed as follows:

That is, an image processing device of the present invention includes (i) an image input section, (ii) a line segment extracting section for extracting line segments from an image inputted to the image input section, (iii) a virtual line segment inserting section for putting a virtual line segment in the image, (iv) a candidate quadrilateral calculating section for calculating a candidate quadrilateral based on (a) the line segments (extracted line segments) obtained by the line segment extracting section and (b) the virtual line segment, and (v) an image correcting section for correcting a distortion in perspective transformation of the image based on a quadrilateral calculated by the candidate quadrilateral calculating section.

It is preferable that the virtual line segment inserting section puts (i) the virtual line segment in a location in one of uppermost, lowermost, leftmost, and rightmost sides of the image or (ii) a plurality of virtual line segments in respective locations in any of the uppermost, lowermost, leftmost, and rightmost sides.

It is preferable that the image processing device of the present invention further includes a select-instruction section for allowing a user of the image processing device to select a location in which the virtual line segment is to be inserted, the virtual line segment inserting section putting the virtual line segment in the location selected via the select-instruction section.

It is preferable that the candidate quadrilateral calculating section corrects the candidate quadrilateral such that a side, containing the virtual line segment, of the candidate quadrilateral becomes in parallel with its opposite side.

It is preferable that the candidate quadrilateral calculating section prioritizes candidate quadrilaterals in accordance with evaluation values, each of which is based on lengths of the extracted line segments and the virtual line segment contained in the candidate quadrilateral.

It is preferable that an evaluation value based on the length of the virtual line segment is smaller than that based on the length of the extracted line segment.

INDUSTRIAL APPLICABILITY

The present invention is applicable to an image processing device which corrects a distortion of a subject in a captured image.

REFERENCE SIGNS LIST

10: Image processing device
13: Contour extracting section (line segment image generating section)
14: Line segment extracting section (line segment image generating section)
15: Candidate quadrilateral calculating section (quadrilateral identifying section, quadrilateral shaping section, prioritizing section)
17: Image correcting section
19: Insert location determining section (determining section)
20: Image processing device
41: Captured image
44: Line segment image
45, 46, 47, 48, 49: Virtual line segment
53: Subject
55: Quadrilateral
100: Digital camera (image processing device)
110: Whiteboard (subject)
111: Captured image
113: Corrected image
200: Computer (image processing device)

The invention claimed is:

1. An image processing device comprising:
a line segment image generating section for generating a line segment image obtained by extracting contour line segments which are line segments contained in a contour of a subject in a captured image;
a quadrilateral identifying section for (i) putting at least one virtual line segment in the line segment image generated by the line segment image generating section, (ii) selecting four line segments from a set which contains the at least one virtual line segment and the contour line segments, and (iii) identifying a quadrilateral defined by four straight lines containing respective selected four line segments; and
an image correcting section for correcting a distortion in perspective transformation of the captured image based on the quadrilateral identified by the quadrilateral identifying section;
a quadrilateral shaping section for changing a location of each of at least one side, which contains the respective at least one virtual line segment, of a quadrilateral identified by the quadrilateral identifying section, the location of each of the at least one side being changed such that each of the at least one side and its opposite side are located in parallel with each other, the image correcting section correcting the distortion in perspective transformation of the captured image based on the quadrilateral which has been shaped by the quadrilateral shaping section.

2. An image processing device as set forth in claim 1, further comprising:
a determining section for determining that the subject in the captured image is interrupted at an outer circumference side of the captured image, the quadrilateral identifying section putting the at least one virtual line segment in the line segment image so as to make up for an interrupted part determined by the determining section.

3. An image processing device as set forth in claim 1, further comprising:
a determining section for determining which one of four sides, which define an outer circumference of the captured image, is in contact with the subject in the captured image, the quadrilateral identifying section putting the at least one virtual line segment in the line segment image such that (i) the at least one virtual line segment extends along respective at least one of four sides determined by the determining section or (ii) the at least one virtual line segment and the respective at least one of four sides overlap each other.

4. An image processing device as set forth in claim 1, further comprising:
a prioritizing section for prioritizing, in a case where the quadrilateral identifying section identifies a plurality of candidate quadrilaterals, identified plurality of quadrilaterals on the basis of lengths of the contour line segments and the at least one virtual line segment, which are contained in each of the plurality of quadrilaterals.

5. The image processing device as set forth in claim 4, wherein:
the quadrilateral identifying section employs, as an evaluation value of a candidate quadrilateral, a value which positively correlates with lengths of the contour line segments and the at least one virtual line segment; and an evaluation value of a unit length of the at least one virtual line segment is set to be smaller than that of a unit length of each of the contour line segments.

6. An image processing method for use in an image processing device, said image processing method comprising the steps of:
(i) generating a line segment image obtained by extracting contour line segments which are line segments contained in a contour of a subject in a captured image;
(ii) (a) putting at least one virtual line segment in the line segment image generated in the step (i), (b) selecting four line segments from a set which contains the at least one virtual line segment and the contour line segments, and (c) identifying a quadrilateral defined by four straight lines containing respective selected four line segments; and
correcting a distortion in perspective transformation of the captured image based on the quadrilateral identified in the step (ii);
a quadrilateral shaping section for changing a location of each of at least one side, which contains the respective at least one virtual line segment, of a quadrilateral identified by the quadrilateral identifying section, the location of each of the at least one side being changed such that each of the at least one side and its opposite side are located in parallel with each other, the image correcting section correcting the distortion in perspective transformation of the captured image based on the quadrilateral which has been shaped by the quadrilateral shaping section.

7. A non-transitory computer-readable storage medium configured to store an image processing program for causing a computer to carry out each of the steps recited in claim 6.

* * * * *